United States Patent [19]

Ito et al.

[11] Patent Number: 4,825,243

[45] Date of Patent: Apr. 25, 1989

[54] FILM IMAGE PROJECTING APPARATUS FOR HANDLING A ROLL FILM CONTAINING A PLURALITY OF ROWS OF FRAMES

[75] Inventors: Masaaki Ito, Kawasaki; Nobuo Ueda, Sagamihara; Masafumi Fujita, Kawasaki, all of Japan

[73] Assignee: Minolta Camera Kabushiki Kaisha, Osaka, Japan

[21] Appl. No.: 48,664

[22] Filed: May 11, 1987

[30] Foreign Application Priority Data

| | | | |
|---|---|---|---|
| May 12, 1986 | [JP] | Japan | 61-107877 |
| Feb. 19, 1987 | [JP] | Japan | 62-37133 |
| Feb. 19, 1987 | [JP] | Japan | 62-37134 |
| Feb. 19, 1987 | [JP] | Japan | 62-37135 |
| Feb. 19, 1987 | [JP] | Japan | 62-37136 |
| Feb. 19, 1987 | [JP] | Japan | 62-37137 |

[51] Int. Cl.[4] ..................... G06K 7/10; G03B 23/12

[52] U.S. Cl. ..................... 355/41; 353/26 A

[58] Field of Search ..................... 353/26 A, 26 R, 81, 353/85, 97, 101, 102; 355/41, 55, 43, 45, 5

[56] References Cited

U.S. PATENT DOCUMENTS

| | | | |
|---|---|---|---|
| Re. 27,817 | 11/1973 | Craig | 353/101 X |
| 2,787,935 | 4/1957 | Inque | 353/102 X |
| 3,629,840 | 12/1970 | Cullen | 340/172.5 |
| 3,809,468 | 5/1974 | Moritz | 353/26 A |
| 4,043,652 | 8/1977 | Mickelson | 353/26 A |
| 4,204,732 | 5/1980 | Maeda et al. | 355/55 |
| 4,278,334 | 7/1981 | Maeda | 353/85 |
| 4,367,033 | 1/1983 | Watanabe | 355/5 |
| 4,408,732 | 10/1983 | Toriumi et al. | 242/192 |
| 4,436,391 | 3/1984 | Kashiwagi | 353/81 X |
| 4,648,707 | 3/1987 | Tanasescu | 355/5 X |
| 4,687,321 | 8/1987 | Itoh | 353/26 A X |

FOREIGN PATENT DOCUMENTS

| | | |
|---|---|---|
| 51-27131 | 6/1976 | Japan . |
| 60-217456 | 10/1985 | Japan . |

*Primary Examiner*—Donald A. Griffin

*Attorney, Agent, or Firm*—Burns, Doane, Swecker & Mathis

[57] ABSTRACT

A film image projecting apparatus such as a microfilm reader and a microfilm printer adapted to automatically retrieve desired information by searching blip marks provided laterally of frames in a roll film. Conventionally, a roll film containing a plurality of rows of frames has been retrieved in most cases by manually placing a target frame in an exposure section. The known apparatus also has the disadvantage of blip marks becoming displaced from an illuminated area when an image is projected in magnification onto a screen, thereby impairing the retrieval operation. The present invention provides a film image projecting apparatus having means for eliminating this disadvantage. More particularly, the disclosed apparatus comprises a film transport mechanism, a cross slide mechanism, a projecting optical system, and a control device for suitably controlling these elements to enable desired information retrieval. The film image projecting apparatus according to the present invention is particularly suited for retrieving and copying images photographed into a plurality of rows of frames in a roll film.

33 Claims, 23 Drawing Sheets

FILM IMAGE PROJECTING APPARATUS FOR HANDLING A ROLL FILM CONTAINING A PLURALITY OF ROWS OF FRAMES

BACKGROUND OF THE INVENTION (1) Field of the Invention

The present invention relates to a film image projecting apparatus such as a microfilm reader and a microfilm printer for retrieving desired information by searching blip marks arranged laterally of frames in a roll film.

(2) Description of the Prior Art

Generally, a film image projecting apparatus such as a microfilm reader and a microfilm printer utilizes a roll film having blip marks arranged laterally of frames. The blip marks are optically detected and counted up for automatic retrieval of a desired frame in the roll film.

FIGS. 1A through 1C of the accompanying drawings illustrate three typical examples of roll film used with the above image projecting apparatus.

As shown in FIG. 1A, the first roll film includes one frame FF transversely thereof containing one image, and a blip mark M disposed laterally of each frame FF. This type of roll film is commonly known as simplex film.

As shown in FIG. 1B, the second roll film includes frames divided into two rows extending longitudinally of the film, and blip marks M arranged along opposite lateral sides thereof. This type of roll film is commonly known as duofilm. One of the two rows is called A-channel CA and the other B-channel CB. The duofilm has a continuous image photographed into frames FFA in A-channel CA, and then the film is reversed for photographing a different continuous image into frames FFB in B-channel CB. Thus, a plurality of mutually related continuous images may be retrieved from the duofilm.

As shown in FIG. 1C, the third roll film includes frames divided into two rows extending longitudinally of the film, and blip marks M arranged along one lateral side thereof. This type of roll film is commonly known as duplex film. As in the case of duofilm, the two rows are called A-channel CA and B-channel CB. The duplex film has a plurality of mutually related continuous images photographed into the frames in the order of FFA, FFB, FFA, FFB and so on.

When the roll film F is illuminated by an exposure lamp or other light source, an illuminated area is formed on the roll film F which is projected in magnification onto a photoreceptor drum to form an electrostatic latent image thereon, or displayed in magnification on a screen. In this connection, known film image projecting apparatus have the following drawbacks:

(1) As noted above, the duplex film has mutually related continuous images photographed into the frames in the order of FFA, FFB, FFA, FFB and so on. Therefore, when copying these images onto recording paper P continuously, it is necessary to move the roll film F in transverse directions thereof for copying each frame.

Conventionally, the roll film F is moved transversely manually by means of a knob or a handle or by operating a specially provided frame select switch. Such a control operation is troublesome, prone to miscopying, and inefficient.

(2) The duofilm and duplex film include two frames FFA and FFB arranged transversely thereof, and hence two centers of the images (see FIGS. 1B and 1C). The image projecting apparatus are constructed to project images in magnification to the screen such that normally the center CO of the simplex film (see FIG. 1A) coincides with the center of the screen. Therefore, when projecting the images contained in frames FFB of the duofilm or duplex film, it is necessary to move the roll film F transversely as above.

However, when the roll film F is moved transversely, the blip marks M on the roll film tend to move out of the illuminated area to the detriment of information retrieval.

(3) Generally, the illuminated area has a light quantity distribution as illustrated in FIG. 2, in which a region adjacent the center of the roll film F is brightly illuminated whereas peripheral regions adjacent blip marks M are less brightly illuminated. Moreover, the light intensity is reduced as a whole when the images are projected in magnification. Therefore, even in the case of simplex film having blip marks M included in the illuminated area, regions of blip marks M are only dimly illuminated thereby causing a blip mark sensor to make errors in detecting the blip marks M.

(4) In the case of reader-printer having a read mode and a print mode and when switching is made to the print mode with the roll film F projected in magnification, an uneven intensity of illumination due to the light distribution results in poor quality copy images.

SUMMARY OF THE INVENTION

A first object of the present invention is to provide a film image projecting apparatus eliminating the drawbacks noted above and capable of an easy and speedy information retrieval even when a roll film includes a plurality of rows of frames.

In order to achieve the first object of the invention, a film image projecting apparatus is provided which permits film images to be copied with ease and automatically retrieved even where the images are recorded sequentially and interrelatedly in frames arranged transversely of the roll film such as in a duplex film. This apparatus comprises judging means for judging whether the roll film contains a plurality of rows of frames; a projecting optical system for projecting images contained in the roll film; a first frame advance means for transporting the roll film frame by frame longitudinally thereof; a second frame advance means operable when the roll film contains a plurality of rows of frames, for moving the roll film transversely thereof to place each of the rows of frames in an exposure section of the projecting optical system; and control means for causing the first frame advance means to transport the roll film when the roll film contains a single row of frames, and causing the first frame advance means and the second frame advance means to transport the roll film when the roll film contains a plurality of rows of frames.

According to the above construction, the roll film is transported longitudinally thereof by the first frame advance means where the roll film includes a single row of frames, and is moved by the first and second frame advance means where the roll film includes a plurality of rows of frames. This permits mutually related continuous images to be projected sequentially. Even where the roll film includes a plurality of rows, the frame selecting operation is now carried out in a very simple manner without being repeated for retrieval of each frame. Therefore, the above film image projecting apparatus is well suited for the copying and retrieval operations.

The first object of the invention may also be achieved by a construction wherein the first frame advance means is operable to transport the roll film a predetermined distance at a time longitudinally thereof, and the second frame advance means is operable to move the roll film a predetermined distance at a time transversely thereof, with suitable controls being provided for these advance means. This construction is suited for copying or retrieving a plurality of frames in batches. A similar effect may be produced by a construction wherein the first frame advance means is operable to transport the roll film frame by frame longitudinally thereof, and the second frame advance means is operable to move the roll film transversely thereof, these frame advance means being selectively actuated.

A second object of the present invention is to provide a film image projecting apparatus capable of an easy and speedy information retrieval where blip marks to be detected are arranged laterally of the frames, by retaining the blip marks within an illuminated area. This apparatus comprises film transport means for longitudinally transporting the roll film including the blip marks arranged laterally of the frames; film moving means for transversely moving the roll film; judging means for judging whether the roll film contains a plurality of rows of frames; a projecting optical system for projecting images contained in the roll film; and control means operable when the roll film is judged by the judging means to contain a plurality of rows of frames, for enlarging an illuminated area on the roll film.

According to the above construction, when the roll film is judged by the judging means to contain a plurality of rows of frames, the control means acts to enlarge the illuminated area on the roll film. This feature is effective to prevent the blip marks from becoming displaced from the illuminated area by the transverse movement of the roll film, which renders the film image projecting apparatus well suited for information retrieval. The above control means is operable to enlarge the illuminated area, but the blip marks may also be kept within the illuminated area by means of control means operable to maintain an amount of illuminating light substantially uniform over a range within which the blip marks are movable. This construction eliminates the errors in detection of the blip marks and is well suited for the simplex film also.

A third object of the present invention is to provide means for facilitating information retrieval with a reader-printer which constitutes one example of film image projecting apparatus. This reader-printer retrieves information by searching blip marks arranged laterally of frames in a roll film, and comprises film transport means for longitudinally transporting the roll film including the blip marks arranged laterally of the frames; a screen for displaying images; copying means for copying projected images on recording paper; a projecting optical system for projecting images contained in the roll film selectively onto the screen and a photoreceptor drum of the copying means; blip mark detecting means for detecting the blip marks and setting a desired one of the frames to a position in an exposure section of the projecting optical system; illuminating means for forming an adjustable illuminated area on the roll film disposed in the exposure section; mode selecting means for switching between a read mode and a print mode; and control means operable in the read mode for causing the frames and the blip marks to be illuminated, and in the print mode for causing a desired area of frame to be illuminated.

The above construction provides convenience for frame retrieval on the screen and permits the images to be copied onto recording paper with high quality by setting the illuminated area to optimal conditions for the read mode and the print mode, respectively. A similar effect may be produced by replacing the above control means with different control means which is operable to adjust the amount of illuminating light for each mode.

The control means may be operable for fixing the illuminated area to a range enabling detection of the blip marks without depending on the magnification of the projecting lens during the read mode for retrieving information, and for varying the illuminated area in accordance with the magnification of the projecting lens during the print mode. It is known from experience that, generally, the blip marks lie in a substantially fixed range irrespective of the type of roll film and the magnification of the projecting lens even when the roll film is projected in magnification onto the screen. Therefore, the retrieval operation is not affected at all if the illuminated area is fixed to the range enabling detection of the blip marks during the read mode without depending on the magnification of the projecting lens. During the print mode, on the other hand, controls are provided for varying the illuminated area in accordance with the magnification of the projecting lens thereby permitting the images to be copied with excellent quality.

BRIEF DESCRIPTION OF THE DRAWINGS

These and other objects or features of the present invention will become apparent from the following description of a preferred embodiment thereof taken in conjunction with the accompanying drawings, in which.

DETAILED DESCRIPTION OF THE PREFERRED EMBODIMENT

In the following description, like parts are designated by like reference numbers throughout the several drawings.

Figure 3:
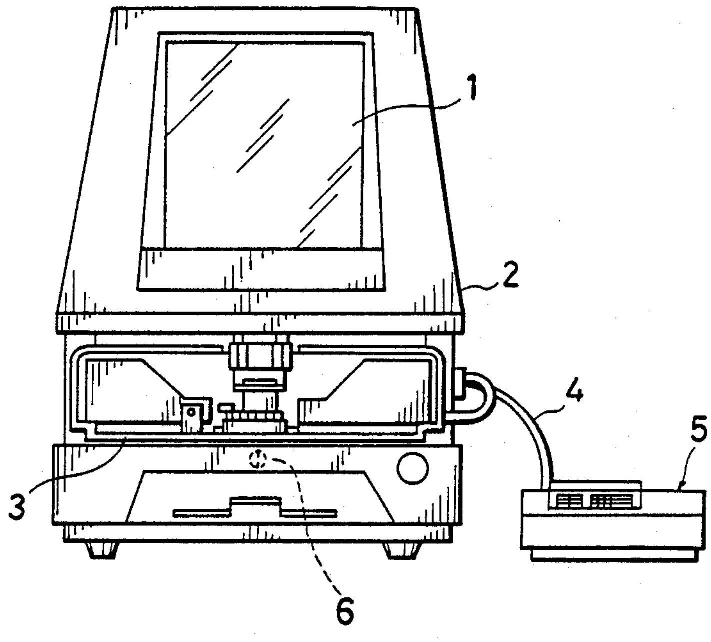
FIG. 3 is a front elevation of a reader-printer.

FIG. 3 shows a reader-printer as one example of film image projecting apparatus according to the present invention. This reader-printer comprises a screen 1 disposed centrally of a main body 2, a film carrier 3 for transporting a roll film bearing a multiplicity of images, and a control unit 5 connected to the carrier 3 through a cable 4. The reader-printer includes a projecting optical system 6 and mode switching means for switching between a reader mode for projecting an enlarged image onto the screen 1 and a print mode for printing the enlarged image on copying paper.

Figure 4:
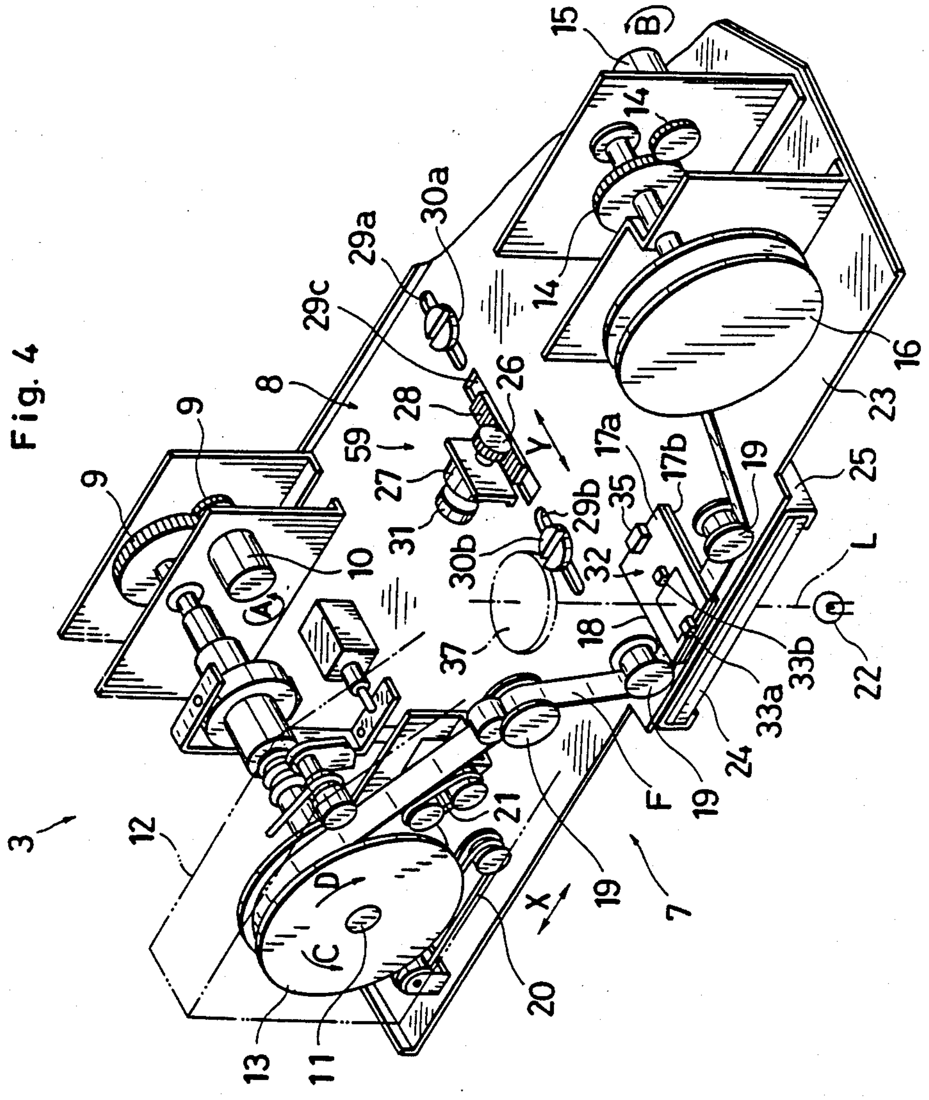
FIG. 4 is a perspective view of a film carrier.

FIG. 4 is a perspective view of the film carrier 3. The carrier 3 comprises a film transport mechanism 7 for transporting the roll film F in longitudinal directions thereof as indicated by an arrow X, and a cross slide mechanism 8 for moving the film F transversely as indicated by an arrow Y.

Specifically, the film transport mechanism 7 includes a first motor 10 rotatable in the direction indicated by an arrow A, a rotary shaft 11 connected to the first motor 10 through pinions 9, 9, a supply reel 13 housed in a cartridge 12 and removably attachable to the rotary shaft 11, a second motor 15 rotatable in the direction indicated by an arrow B, a takeup reel 16 connected to the second motor 15 through pinions 14, 14 an exposure station 18 having a pair of upper and lower glass plates 17*a*, 17*b* for supporting the film F therebetween, a plurality of guide rollers 19 for guiding the film F in transportation, a feeder belt 20 and a separator belt 21. The exposure station 18 is constructed such that the center of the film F coincides with a projecting optical axis L of an exposure lamp 22 which is one example of light source when the film carrier 3 is assembled into the main body 2 of the reader-printer. Number 23 indicates a movable deck for supporting the film transport mechanism 7.

According to the film transport mechanism 7 as constructed above, when the cartridge 12 containing the supply reel 13 is mounted on the rotary shaft 11, the supply reel 13 rotates for a moment in the direction indicated by an arrow C. This is for eliminating the relaxation of the film F rolled on the supply reel 13. Thereafter, the feeder belt 20, which is operatively connected to a feed motor not shown, is moved into contact with the film F to rotate the supply reel 13 in the direction indicated by an arrow D, whereupon a leading end of the film F is drawn out by the separator belt 21. Then, the leading end of the film F is driven by the feed motor to advance past the guide rollers 19 and through a space between the pair of glass plates 17*a*, 17*b* to be wound around the takeup reel 16. Next, the feeder belt 20 and separator belt 21 are moved away from the film F which is then supported between the glass plates 17*a*, 17*b*. The film F now is ready for backward and forward movements, the forward movement being effected by actuating the first motor 10 and the backward movement by actuating the second motor 15, both under control by a film transport control unit to be described later.

The cross slide mechanism 8 includes, as principal components thereof, the movable deck 23, a base 25 having an approximately inverted U-shape section and slidably mounted on a table 24 fixed to the main body 2 of the reader-printer, a third motor 27 mounted on the movable deck 23 and having a shaft carrying a pinion 26, and a rack 28 fixed to the base 25 and meshed with the pinion 26. The movable deck 23 defines three slots 29*a*, 29*b* and 29*c*. The slot 29*c* exposes the rack 28 to the movable deck 23, and the slots 29*a* and 29*b* receive guide pins 30*a* and 30*b* having distal ends thereof fixed to the base 25, respectively, whereby the movable deck 23 is connected to the base 25. The third motor 27 is provided with a rotary encoder 31 and is rotatable backward and forward to move the movable deck 23 transversely of the film F relative to the base 25. The rotary encoder 31 outputs the number of rotations of the third motor 27 as an electric signal, and a relative position between the movable deck 23 and the base 25 is detected through a cross slide control unit to be described later. Thus, the pinion 26, the rack 28 and the third motor 27 constitute projected frame selecting means 59 which, where the film F is a duofilm or a duplex film having two frames FFA and FFB transversely, is adapted to selectively place the center of frame FFA or FFB to coincide with the optical axis L thereby causing the image in the frame FFA or FFB to be projected centrally of the screen 1. Furthermore, the cross slide mechanism 8 is movable by a condenser lens drive control unit to be described later, to substantially uniformalize the quantity of light for illuminating the film F.

Figure 1A:
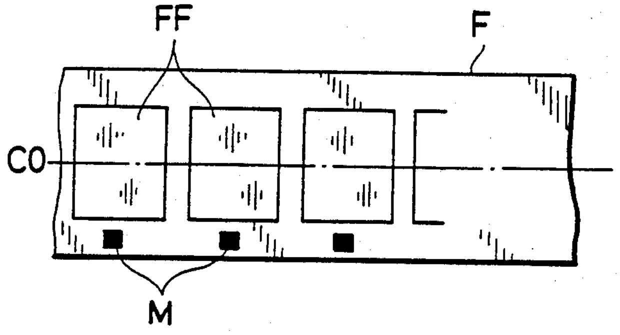
FIG. 1A is a plan view of a simplex film.
Figure 1B:
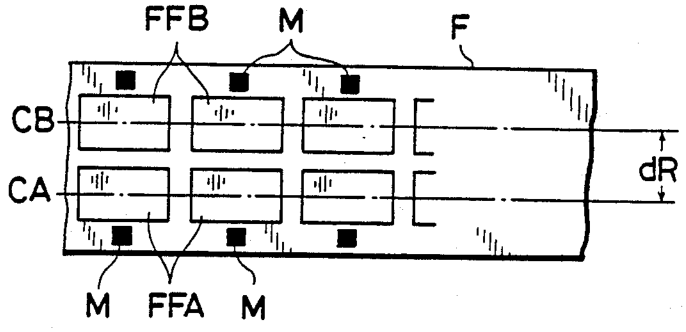
FIG. 1B is a plan view of a duofilm.
Figure 1C:
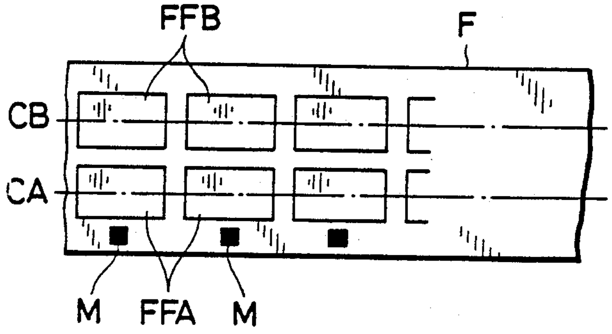
FIG. 1C is a plan view of a duplex film.
Figure 2:
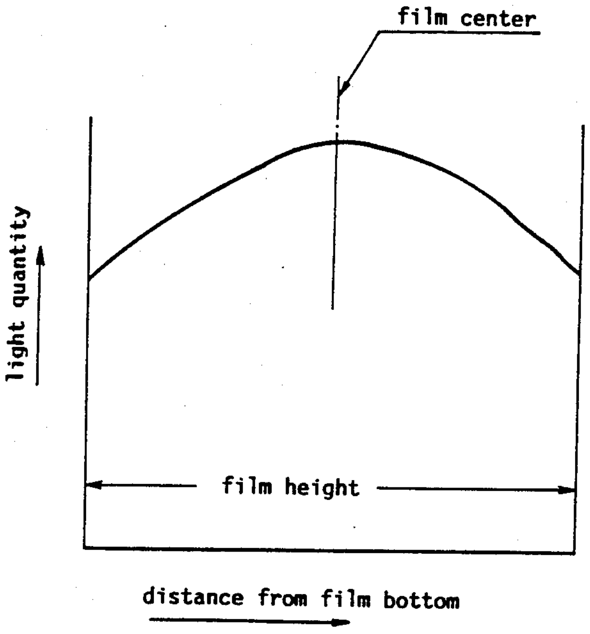
FIG. 2 is a view of a light distribution over a film surface.
Figure 5:
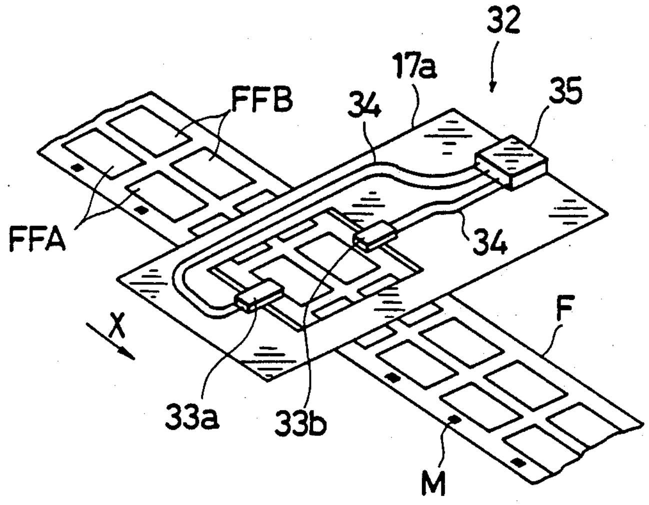
FIG. 5 is a perspective view of a blip mark sensor.

One of the glass plates 17*a* constituting part of the exposure station 18 carries a blip mark sensor 32. As shown in FIG. 5, the blip mark sensor 32 comprises two light receiving elements 33*a* and 33*b* opposed to each other across the film F, and a sensor main body 35 connected to the light receiving elements 33*a* and 33*b* through cables 34. The sensor main body 35 is preset with a reference voltage (reference value) for detecting blip marks M. According to the blip mark sensor 32 as constructed above, when, for example, a duplex film is transported in the direction indicated by an arrow X in FIG. 5 and one of the light receiving elements 33*a* is intercepted by blip mark M, the light receiving element 33*a* detects a resulting change in the quantity of light received and then this change is converted to a voltage. If the voltage exceeds the reference voltage, the sensor main body 35 operates and the blip mark M is detected. Each time the blip mark M is detected by the blip mark sensor 32, a film counter, not shown, is incremented. The frames FFA or FFB corresponding to the number of blip marks are retrieved on the basis of the count of the film counter. When searching a duofilm as shown in FIG. 1B, the two light receiving elements 33*a* and 33*b* of course detect blip marks M in A-channel CA and B-channel CB, respectively.

Figure 6:
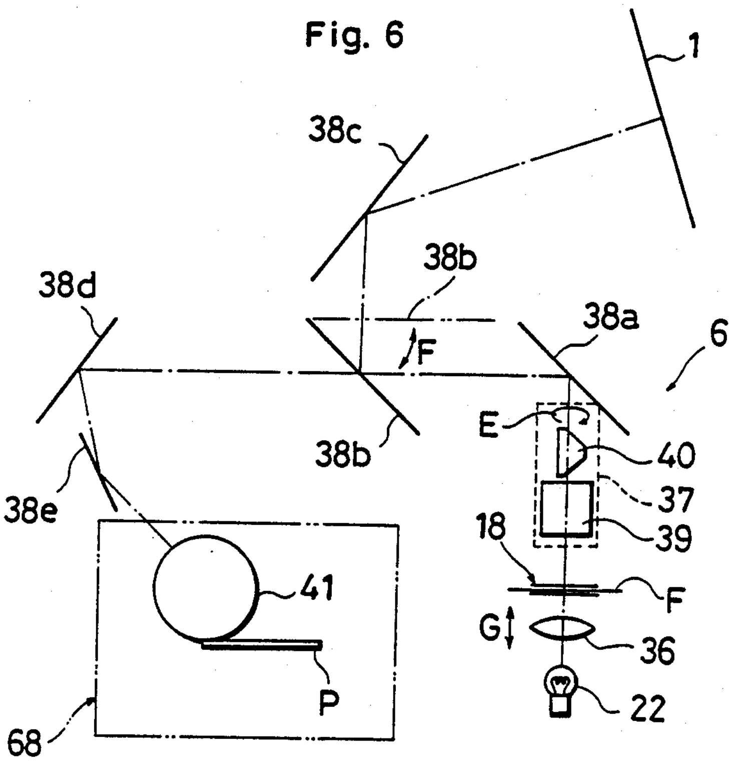
FIG. 6 is a schematic view of a projecting optical system.

FIG. 6 is a schematic view showing an outline of the projecting optical system 6. The optical system 6 comprises the exposure lamp 22, a condenser lens 36 movable by a condenser lens drive mechanism to be described later, in the directions indicated by an arrow G to vary an area of the film F to be illuminated, the described exposure station 18 for supporting the film F in a sandwich fashion, a projecting module 37, and a plurality of mirrors 38*a*–38*e*. The projecting module 37 includes a projecting lens unit 42 containing a projecting lens 39 for magnifying the images on the film F, and a trapezoidal image turning prism 40. The image turning prism 40 is rotated in the direction indicated by an arrow E by means of an unillustrated push button switch where an image on the film F is sideways or inverted, thereby to project the image as erected onto the screen 1.

According to this projecting optical system 6, when in the reader mode, the image on the film F illuminated by the exposure lamp 22 through the condenser lens 36 is projected in magnification onto the screen 1 after passing through the projecting module 37, the first mirror 38*a*, second mirror 38*b* and third mirror 38*c*. For the print mode the second mirror 38*b* is rotated in the direction of arrow F, and the image emerging from the projecting module 37 passes through the first mirror 38*a*, fourth mirror 38*d* and fifth mirror 38*e* to be copied in magnification onto recording paper P by means of a copying mechanism 68 which is one example of copying means. The copying mechanism 68 is operable through the well-known electrophotographic process and includes, in addition to a photoreceptor drum 41, a charging device, a developing device, a transfer device, a cleaning device and a charge eraser not shown. The image from the film F emerging from the mirror 38*e* forms an electrostatic latent image on the photoreceptor drum 41, and subsequently an enlarged copy of the image is formed on the recording paper P through the electrophotographic process.

Figure 7:
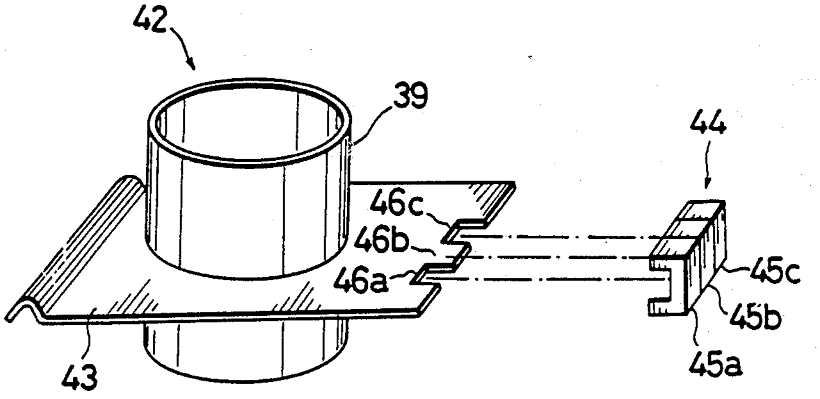
FIG. 7 is a perspective view of a projecting lens identifying sensor.

FIG. 7 is a perspective view of the projecting lens unit 42 constituting part of the projecting module 37. Number 43 indicates a mounting plate for peripherally supporting the projecting lens 39. Number 44 indicates a projecting lens judging sensor which is one example of judging means according to the present invention for confirming magnifying of the projecting lens 39. The projecting lens judging sensor 44 includes three photo interrupters 45*a*, 45*b* and 45*c* comprising a combination of a photo emitting element and a photo receiving element. The mounting plate 43 is cut out at one edge to define a jagged portion 46*a*, 46*b* and 46*c*. The photo interrupters 45*a*, 45*b* and 45*c* and the jagged portion 46*a*, 46*b* and 46*c* act in combination to judge the magnifying power of the projecting lens 39, and a suitable control is provided by a control mechanism to be described later. According to this embodiment, the magnifying power of the projecting lens 39 is manually selected by changing the projecting lens unit 42.

Figure 8A:
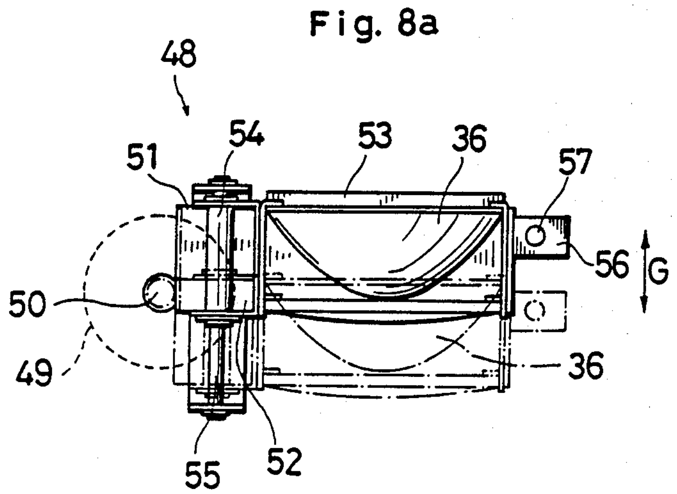
FIG. 8*a* is a plan view of a condenser lens drive mechanism.
Figure 8B:
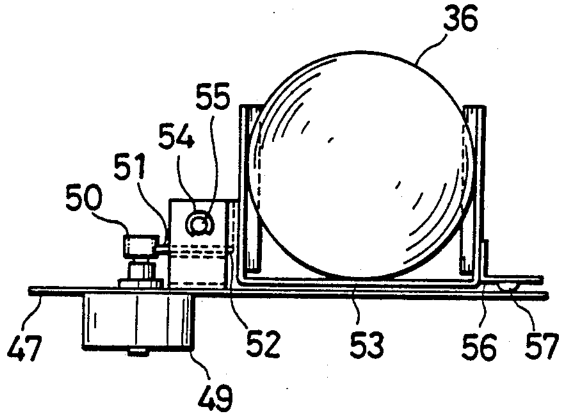
FIG. 8*b* is a front view of the condenser lens drive mechanism.

FIGS. 8*a* and 8*b* show the condenser lens drive mechanism 48 for moving the condenser lens 36 in the directions of arrow G. This drive mechanism 48 comprises a pulse motor 49 fixed to a base 47, a pinion 50 supported by the pulse motor 49 through a shaft extending therefrom, a rack 51 meshed with the pinion 50, a holder 53 for supporting the condenser lens 36 and fixedly carrying the rack 51 through a first support member 52, and a runner 57 secured to the holder 53 through a second support member 56 having a rectangular shape when viewed in plan. The holder 53 is slidably supported at one end thereof by a shaft 55 through the first support member 52 and by means of a sliding bearing 54. The other end of the holder 53 is movable on the base 47 through the second support member 56 and by means of the runner 57. With the above construction, the condenser lens 36 carried by the condenser lens drive mechanism 48 is driven back and forth in the directions of arrow G by backward and forward rotations in a fixed amount of the pulse motor 49.

Figure 9:
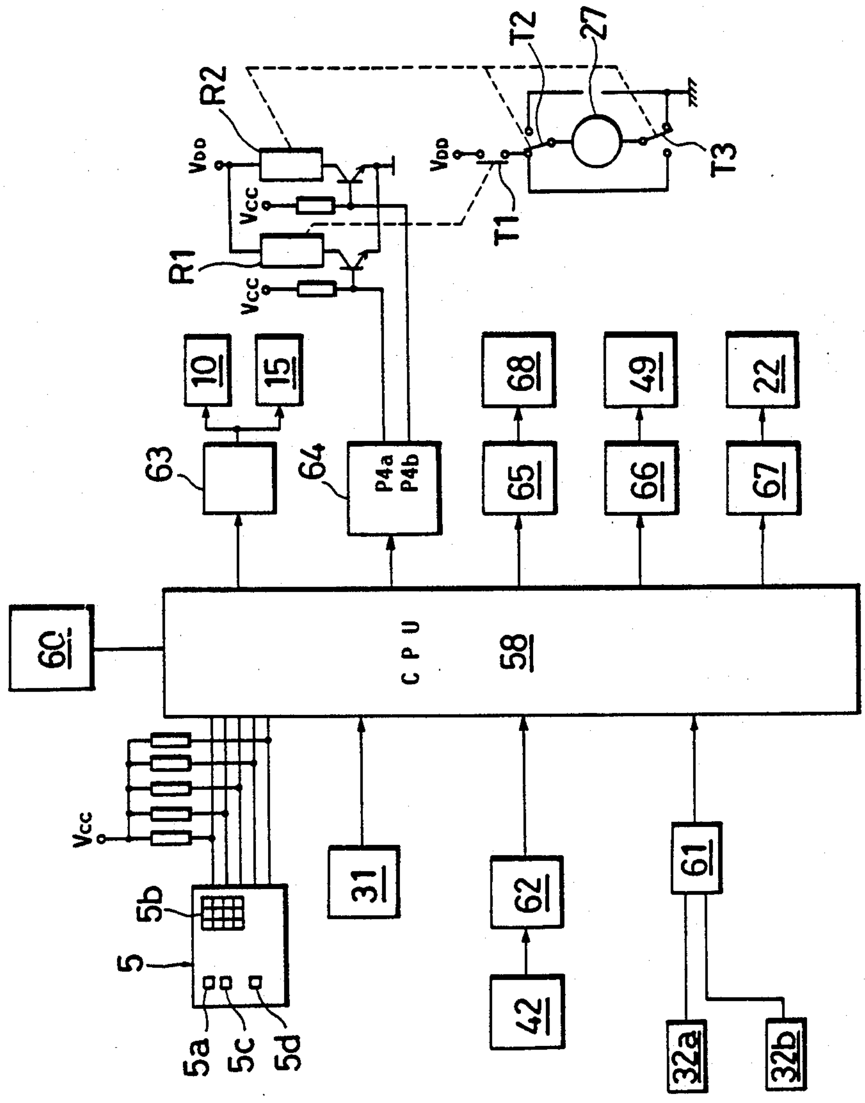
FIG. 9 is a block diagram illustrating a control system of the reader-printer.

FIG. 9 is a block diagram showing a control system of the reader-printer according to this embodiment. Number 58 indicates a CPU including an operation part, a ROM, a RAM and input and output ports. The control unit 5 which is also shown in FIG. 3 constitutes one example of means for judging whether the roll film has plural rows of frames or not. More particularly, the control unit 5 includes a film select key 5*a* manually operable to select a retrieval mode, i.e. to determine whether the roll film is a duplex film needing to be moved transversely thereof or a simplex film (or a duofilm) not to be moved transversely. The control unit 5 further includes ten keys 5*b* manually operable to input parameters such as the number of copies to be taken, the frames to be retrieved and so on. These input data are shown on an indicator 60. Number 5*c* indicates a scan mode key for deciding whether the film F should be allowed to move transversely thereof or not. Number 5*d* indicates a print key for providing a print command for the CPU 58. The simplex film and duofilm are different in the form of frames, and which type of film the roll film F is automatically judged by a control mechanism to be described later.

The light from the exposure lamp 22 having passed through the roll film F is received by the light receiving element 33*a* and/or the light receiving element 33*b*, and the amount of light transmission is converted to a voltage by a photoelectric conversion element of the blip mark sensor 32. The blip mark sensor 32 catches variations in the voltage resulting from the passage of blip marks M, and inputs detection signals corresponding to the detected blip marks M in the A-channel CA and B-channel CB to the CPU 58 by way of a blip mark detector 61. When light hits the projecting lens judging sensor 44, the photo interrupters 45*a*, 45*b* and 45*c* read the shape of the jagged portion 46*a*, 46*b* and 46*c* of the mounting plate 43 to judge the magnifying power of the projecting lens 39, and inputs a resulting electric signal to the CPU 58 by way of a projecting lens judge unit 62. The rotary encoder 31 also inputs the signal to the CPU 58 according to the rotation of motor 27. In response to the various signals as noted above, the CPU 58 transmits control signals to a film transport control unit 63, a cross slide control unit 64, a condenser lens drive control unit 65, an exposure lamp control unit 66, and a copying process control unit 67, respectively.

The film transport control unit 63 constitutes one example of first frame advance means. The control unit 63 is operable in response to data received from the CPU 58 concerning transport speed and direction, and controls the first motor 10 and the second motor 15 to advance frames in accordance with the type of film, a duofilm or a simplex film. Where the duofilm is used, for example, the film transport control unit 63 permits images to be copied continuously by selecting a frame in the channel selected by the projected frame selecting means 59 each time the roll film F is advanced one frame by the film transport mechanism 7. In the case of duofilm, an image extending over a plurality of frames normally is photographed into a series of frames FFA or FFB arranged longitudinally of the film F in either A-channel or B-channel. Therefore, for continuously copying fractions of the image from the plurality of frames, the movable deck 23 of the carrier 3 is moved first to select one of the channels and thereafter the image is copied by actuating the film transport mechanism 7 to advance the film F frame by frame. Specifically, the CPU 58 compares the number of blip marks M counted up by the blip mark sensor 32 with the number of frames to be retrieved which is input from the control unit 5, and in response to results of the comparison the first motor 10 and the second motor 15 are controlled to move the film F backward and forward.

The cross slide control unit 64 constitutes one example of second frame advance means operable to advance the frames in the duplex film. In the case of duplex film, a continuous image is photographed into the frames in the order of FFA, FFB, FFA, FFB. . . as noted hereinbefore. It is therefore necessary, when copying the image, to switch from one channel to the other every now and then or to combine copies taken from the two channels. According to the present invention, each time the film transport mechanism 7 advances the roll film F by one frame, the projected frame selecting means 59 sequentially selects the two frames FFA and FFB arranged transversely of the film F and the cross slide mechanism 8 moves the film F transversely. Specifically, the cross slide control 64 drives the third motor 27 shown in FIG. 4 in response to data received from the CPU 58 indicating positions of the film to be projected. As shown in FIG. 9, the third motor 27 is switchable between an operative state and an inoperative state by on-off operations of a first relay contact T1 and between opposite rotation by changeover operations of a second and a third relay contacts T2 and T3. The first relay contact T1 is operatively connected to a first relay R1 which is switched on and off by a signal received from an output port P4*a* of the cross slide control unit 64. The second and third relay contacts T2 and T3 are operatively connected to a second relay R2 which is switched on and off by a signal received from an output port P4*b* of the cross slide control unit 64.

The CPU 58 determines a present position of the movable deck 23 by calculating a coordinate value in the transverse direction of the roll film F corresponding to the present position of the movable deck 23 on the basis of the signal received from the rotary encoder 31. This provides the basis for appropriately controlling the position of movable deck 23 of the cross slide mechanism 23 in the transverse direction of the film F. In other words, the CPU compares the present position of the movable deck 23 input from the rotary encoder 31, namely information on the present channel position, with the retrieval mode input from the control unit 5. If the two data do not agree, the signal output from the output port P4*a* is switched to high level which turns on the first relay R1 and drives the third motor 27 to rotate in an appropriate direction. When the retrieval mode and the channel position come into agreement, the signal from the output port P4*a* is switched to low level for stopping the movable deck 23.

Thus, the present invention utilizes the frame selecting action of the projected frame selecting means 59 to permit a plurality of images contained in the frames FFA and FFB to be copied simply and continuously where the roll film comprises a duplex film or a duofilm. To be particular, the projected frame selecting means 59 is actuated in accordance with the type of film F manually selected by means of the film select key 5*a* provided on the control unit 5, to drive the film transport control unit 63 acting as the first frame advance means and the cross slide control unit 64 acting as the second frame advance means. This construction is capable of copying a plurality of correlated images fractions photographed into the film F whether the film F is a duofilm or a duplex film.

Furthermore, the present invention simplifies the image retrieval by utilizing the two frame advance means. In addition to the method as described above by which the numbers of the frames to be retrieved is input through the control unit 5, the invention permits the user to monitor enlarged images projected onto the screen 1 while advancing the roll film F by fixed amounts and to stop the film F when a selected image appears on the screen 1. When the duplex film is used, the film F is advanced by the described film transport control unit 63 acting as the first frame advance means and the cross slide control unit 64 acting as the second frame advance means to readily project images of high magnification which facilitates the image search operation.

The condenser lens drive control unit 65 constitutes one example of control means according to the present invention. This control unit 65 is operable in response to data received from the CPU 58 indicating positions of the condenser lens 36 to drive the pulse motor 49 and move the condenser lens 36 to those positions. At times of retrieval in the reader mode, the condenser lens 36 is fixed to a predetermined position so that blip marks M do not deviate from the illuminated area regardless of the magnification rate of the projecting lens when the third motor 27 of the cross slide mechanism 8 is driven to move the roll film F transversely. At non-retrieval times the condenser lens 36 may be set to a desired position by a manual or automatic control. On the other hand, at times of the print mode the condenser lens drive mechanism 65 is operable to suitably drive the condenser lens 36 in accordance with the magnification rate of the projecting lens for enabling optimal copying.

The exposure lamp control unit 66, which is one example of lighting means, is operable in response to data received from the CPU 58 indicating a quantity of light to control the quantity of light provided by the exposure lamp 22 by means of the known phase angle power control mode. When the condenser lens drive control unit 65 drives the condenser lens 36 in the direction to enlarge the illuminated area, the quantity of illuminating light normally is reduced to impair projected image visibility. According to the present invention, the exposure lamp control unit 66 acts to maintain a fixed quantity of light at all times by varying the voltage for the exposure lamp 22 with variations in the illuminated area resulting from the movement of the condenser lens 36. That is to say, when the illuminated area is enlarged by the action of the condenser lens drive mechanism 65, the exposure lamp control unit 66 takes a control action to increase the voltage for the exposure lamp 22 in order to compensate for the reduction in the quantity of illuminating light.

The copying process control unit 67 is operable in response to commands received from the CPU 58 to control a copying mechanism 68 acting as copying means. The copying operation is carried out by the known electrophotographic process as noted hereinbefore.

The control sequence according to this embodiment will be described hereinafter with reference to the flowcharts shown in FIGS. 10 through 21. These flowcharts employ flags which are defined in Table 1 below.

TABLE 1

| | | |
|---|---|---|
| ENB | scan mode | 0: scan prohibit mode<br>1: scan permit mode |
| MODE | retrieval mode | 0: simplex & duo retrieval mode<br>1: duplex retrieval mode |
| DUO | duofilm mode | 0: not duofilm<br>1: duofilm |
| AN | A-channel frame No. | |
| BN | B-channel frame No. | |
| TN | target frame No. | |
| CH | retrieval completed channel | |
| BCNT | number of B-channel marks | Number of blip marks in B-channel is counted as absolute value independently of BN. |
| FNS | copy starting frame No. | |
| FNE | copy finishing frame No. | |
| FFS | copy starting channel | 1: A-channel<br>2: B-channel |
| FFE | copy finishing channel | 1: A-channel<br>2: B-channel |
| CF | channel flag | 0: A-channel<br>1: B-channel |

Figure 10A:
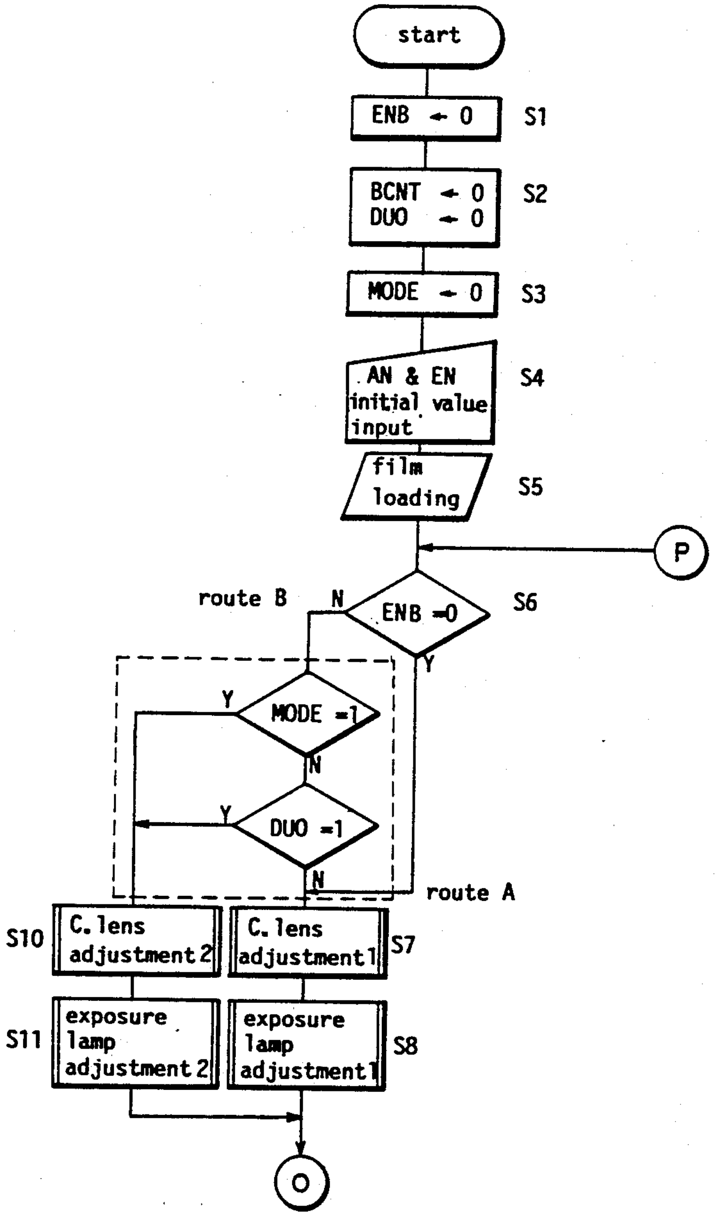
FIGS. 10*a* and 10*b* are flowcharts illustrating an entire control sequence of the reader-printer according to the present invention.
Figure 10B:
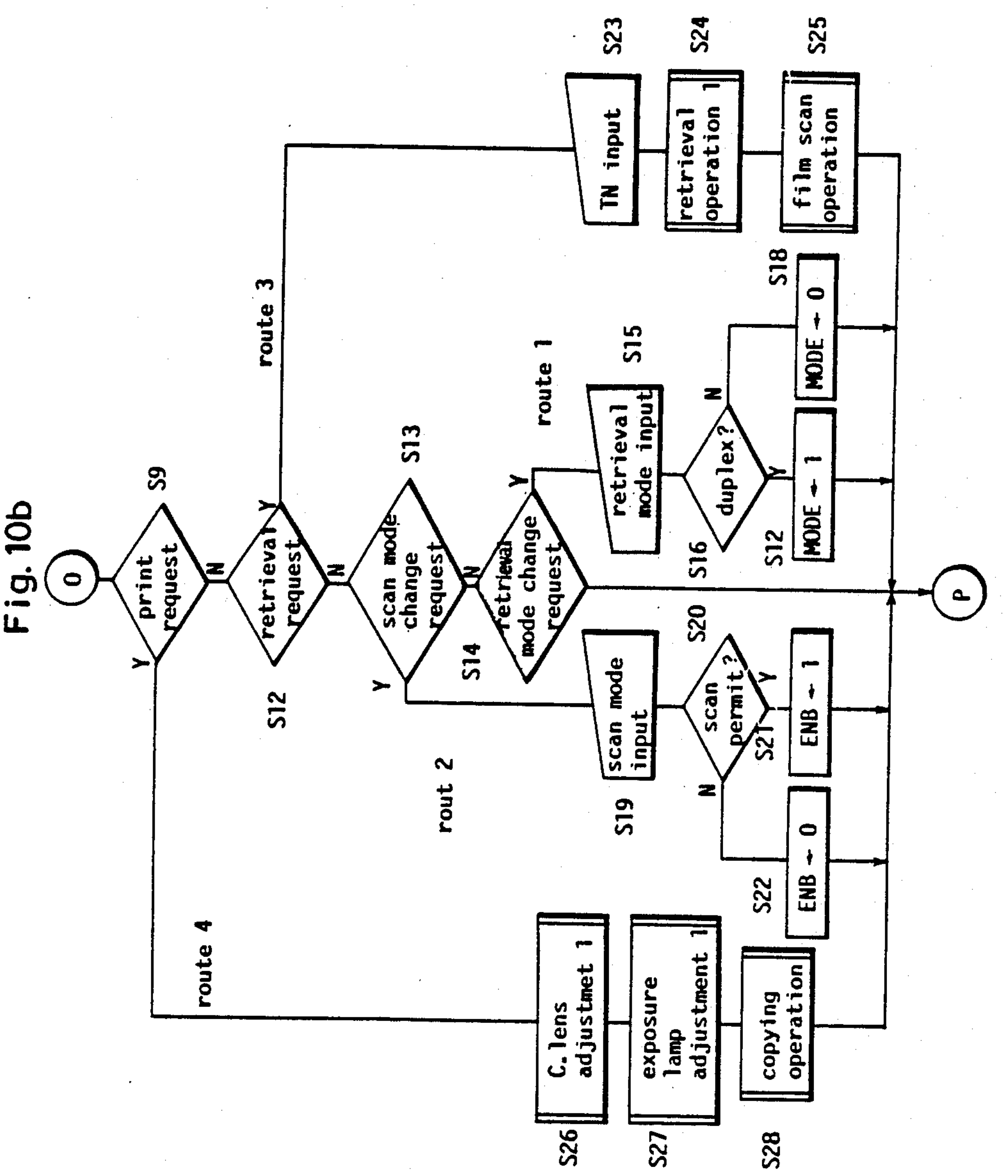

FIGS. 10*a* and 10*b* show a flowchart of an overall control sequence according to this embodiment.

Steps S1–S4 in FIG. 10*a* represent initialization. At step S1 EMB is set to "0" to provide the scan prohibit mode. At step S2 BCNT is set to "0" to reset the counter for counting the blip marks in B-channel, and DUO is set to "0" to provide the non-duofilm mode. At step S3 MODE is set to "0" to provide the simplex film and duofilm retrieval mode, and power is switched on. At step S4 initial values of frame numbers in A-channel and B-channel are manually input. At step S5 the reader-printer is loaded with a rolled film, and the program proceeds to specific controls.

Figure 11:
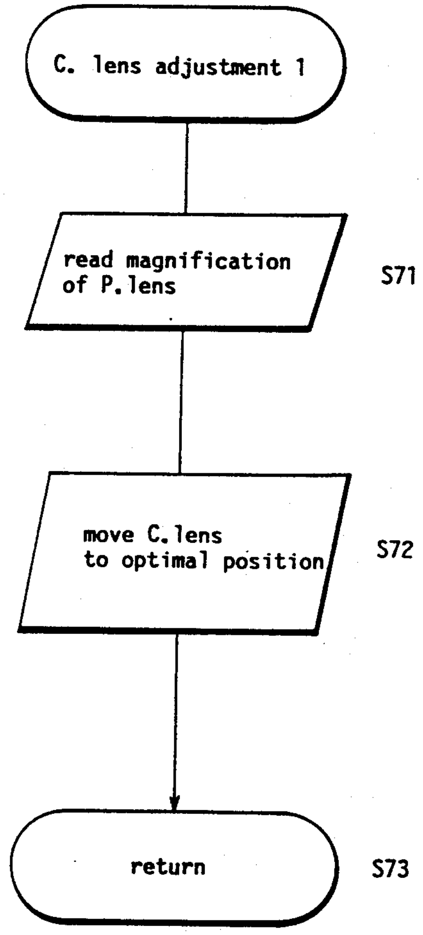
FIG. 11 is a flowchart of condenser lens adjustment 1.

First at step S6 checking is made whether ENB is "0" or not, namely whether the film may move transversely or not. If ENB is "0" the program takes route A. If ENB is "1" the program takes route B. When route A is taken, a subroutine is executed for condenser lens adjustment 1 first at step S7. Thereafter, a subroutine for exposure lamp adjustment 1 is executed at step S8. Then the program moves to step S9 for judging whether a print request as shown in FIG. 10*b* is present or not. Route A is, by means of condenser lens adjustment 1 (relating to the condenser lens drive control unit 64) and exposure lamp adjustment 1 (relating to the exposure lamp control unit 65), for setting the position of the condenser lens 36 and luminous intensity of the exposure lamp 22 to assure an optimal copying operation. Specifically, as shown in FIG. 11, condenser lens adjustment 1 includes step S71 for reading from the projecting lens judging sensor 44 the magnification rate of the projecting lens 39 mounted in the projecting optical system 6 and inputting the corresponding electric signal to the CPU 58. Thereafter, at step S72, the condenser lens drive mechanism 48 is driven in response to the data received from the CPU 58 to move the condenser lens 36 to an optimal position for copying in accordance with the magnification rate of the projecting lens 39, and at step S73 the subroutine returns to the main routine. When the image is copied in the same A4 size, for example, the film will be copied over different areas if the magnification ratio of the projecting lens is varied. According to this embodiment, the condenser lens is moved to a position to reduce the magnification rate of the projecting lens when the rate is large, whereby the target area of the film is illuminated by a uniform intensity of light.

Figure 12:
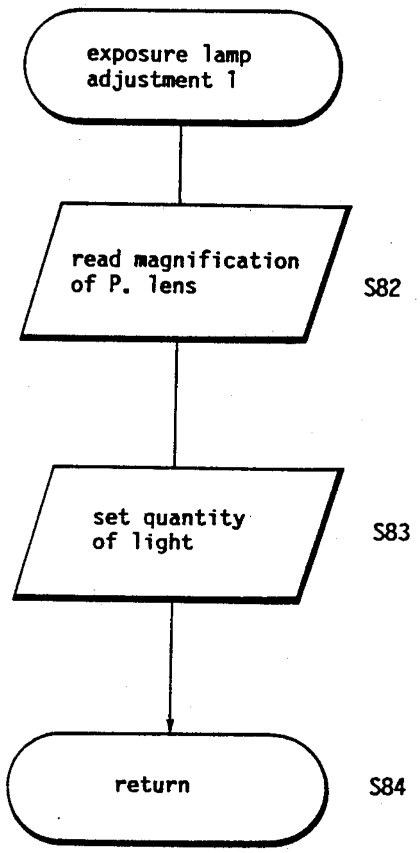
FIG. 12 is a flowchart of exposure lamp adjustment 1.

As shown in FIG. 12, exposure lamp adjustment 1 includes step S82 for reading the magnification rate of the projecting lens 39 like step S71 of condenser lens adjustment 1, and step S83 for actuating the exposure lamp control unit 66 to set a quantity of light. In other words, the quantity of light emitted from the exposure lamp is determined in accordance with the magnification rate of the projecting lens. This assures an optimal quantity of light on the screen or on the photorecepter drum at all times regardless of the magnification rate of the projecting lens.

If ENB is found to be "1" at step S6, the program moves to route B which is for a scan permit mode, namely a mode for permitting the film F to move transversely. If the film F is judged to be a duplex film or a duofilm, a subroutine for condenser lens adjustment 2 is executed at step S10 and then a subroutine for exposure lamp adjustment 2 is executed at step S11, after which the program moves to step S9 in FIG. 10*b* for judging whether a print request is present or not. If the film F is judged to be a simplex film which need not be moved transversely in spite of the scan permit mode, the program proceeds through steps S7–S9 as when taking route A. In other words, route B constitutes one example of judging means for judging whether or not the film F includes a plurality of frame rows. The condenser lens adjustment 2 and exposure lamp adjustment 2 are carried out only if the film F includes a plurality of rows, namely in the case of duplex film or duofilm, as described above. The position of the condenser lens 36 and luminous intensity of the exposure lamp 22 are set through condenser lens adjustment 2 and exposure lamp adjustment 2 so as to provide optimal conditions for searching blip marks M.

Figure 13:
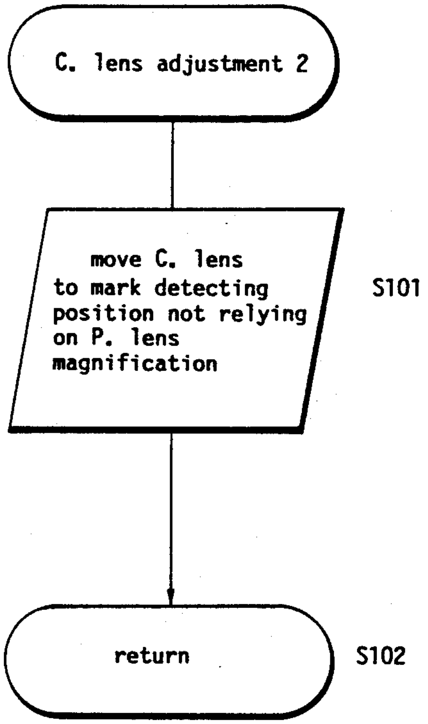
FIG. 13 is a flowchart of condenser lens adjustment 2.

Specifically, as shown in FIG. 13, condenser lens adjustment 2 includes step S101 for driving the condenser lens drive mechanism 48 to move the condenser lens to an optimal position for detecting the blip marks M without relaying on the magnification by the projecting lens. Normally, the greater the magnification of the projecting lens, the smaller becomes the illuminated area of the film F and the blip marks M could be displaced from the illuminated area when the film F is moved transversely thereof. The present invention permits the blip marks M to be detected by setting the position of condenser lens 36 independently of the magnification rate of the projecting lens so that the blip marks M remain in the illuminated area at retrieval times even when the film F is moved transversely. Experience shows that the blip marks M generally lie in a substantially fixed area irrespective of the type and magnifying rate of film F when the film F is projected in magnification onto the screen 1. Therefore, the blip marks M may be set to a substantially fixed position at retrieval times irrespective of the magnification rate of the projecting lens, and the searching operation is in no way hampered by the fixation of the condenser lens independently of the magnification rate of the projecting lens. The question at issue here is the position of the condenser lens at retrieval times, and the condenser lens may be set to any desired position at non-retrieval times.

Furthermore, in condenser lens adjustment 2 the condenser lens 36 is set to a position to provide an area on the film surface illuminated by a substantially uniform quantity of light within a range of movement of the blip marks M. When the case of projecting the simplex film in magnification and the case of projecting the duofilm or the duplex film in magnification are compared, variations in the quantity of illuminating light over a maximum range of movement of the blip marks M are about 30%. The quantity of light is made substantially uniform over this range so as to facilitate detection of the blip marks M.

Figure 14:
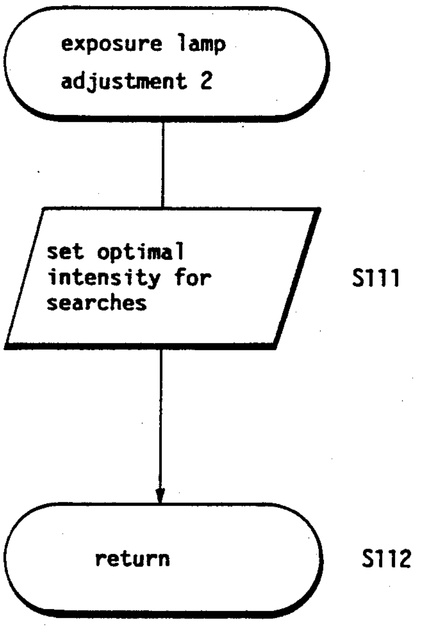
FIG. 14 is a flowchart of exposure lamp adjustment 2.

Referring to FIG. 14, the exposure lamp adjustment 2 includes step S111 for actuating the exposure lamp control unit 66 to set an optimal intensity of light for film retrieval. When moving the film F transversely, condenser lens adjustment 2 is carried out at step S10 to enlarge the illuminated area to cover the range of its movement without regard to the magnification rate of the projecting lens 39. The enlargement of the illuminated area normally results in a reduction in the light intensity. Therefore, exposure lamp adjustment 2 is carried out at step S11 to increase the light intensity over the illuminated area for an effective retrieval. The illumination adjustment for the exposure lamp 22 specifically is carried by adjusting the voltage for the exposure lamp 22. According to exposure lamp adjustment 2 at step S11, the intensity of light on the screen may be maintained constant regardless of the magnification rate by varying the intensity of light over the illuminated area in accordance with the magnification rate, with a lower limit level not too low for the searches.

Various operations including the print operation and the retrieval operation are carried out after the condenser lens 36 and the exposure lamp 22 are set to the optimal conditions for the print operation and the detection of the blip marks M as described above. Control sequences for the print operation and retrieval operation will be described hereinafter with reference to FIG. 10*b*.

If none of the print operation, the retrieval operation, the scan mode change operation, and the retrieval mode change operation are requested, the program proceeds through steps S9, S12–S14 and returns to step S6. If a scan mode change request for switching, for example, from the simplex film or duofilm retrieval mode to the duplex film retrieval mode, the program proceeds from step S14 along route 1. In this case, for example, the duplex retrieval mode is manually key-input at step S15, and then checking is made at step S16 whether the film loaded is a duplex film or not. If the duplex film is detected, MODE is set to "1" at step S17 and the program returns to step S6. For retrieving a film other than the duplex film, the corresponding key is pressed at step S15, and the film is confirmed to be the intended type of film at step S16. After setting MODE to "0" the program returns to step S6.

If the scan mode change request is present, the program takes route 2 after steps S9, S12 and S13. When a switch from the scan prohibit mode to the scan permit mode is desired, for example, the scan permit mode is key-input at step S19 and then checking is made at step S20 whether it is the scan permit mode or not. In the case of scan permit mode, ENB is set to "1 " at step S21. In the case of scan prohibit mode, ENB is set to "0" at step S22. The program then returns to step S6. This scan mode change operation is carried out by the film transport control unit 64.

If the request for the retrieval operation is present, the program takes route 3 from step S12. In this case, the number of target frame TN is key-input at step S23, then a subroutine for retrieval operation 1 to be described later is executed at step S24, and a subroutine for the film scan operation is executed at step S25. After the target image is projected onto the screen, the program returns to step S6. This scan operation is carried out by the film transport control unit 63 and the cross slide control unit 64.

If the print request is present, the program takes route 4 from step S9. In this case, the subroutine for condenser lens adjustment 1 is executed at step S26 as in the flowchart of FIG. 11 to set the condenser lens to the optimal position for copying. Thereafter, the subroutine for exposure lamp adjustment 1 is executed at step S27 as in the flowchart of FIG. 12 to set the exposure lamp to the optimal intensity of light for copying Condenser lens adjustment 1 and exposure lamp adjustment 1 are executed whenever the print operation is carried out. Subsequently, a subroutine for the copying operation to be described later is executed at step S28 and the program returns to step S6. This print operation is carried out by the printing process control unit 67.

Figure 15:
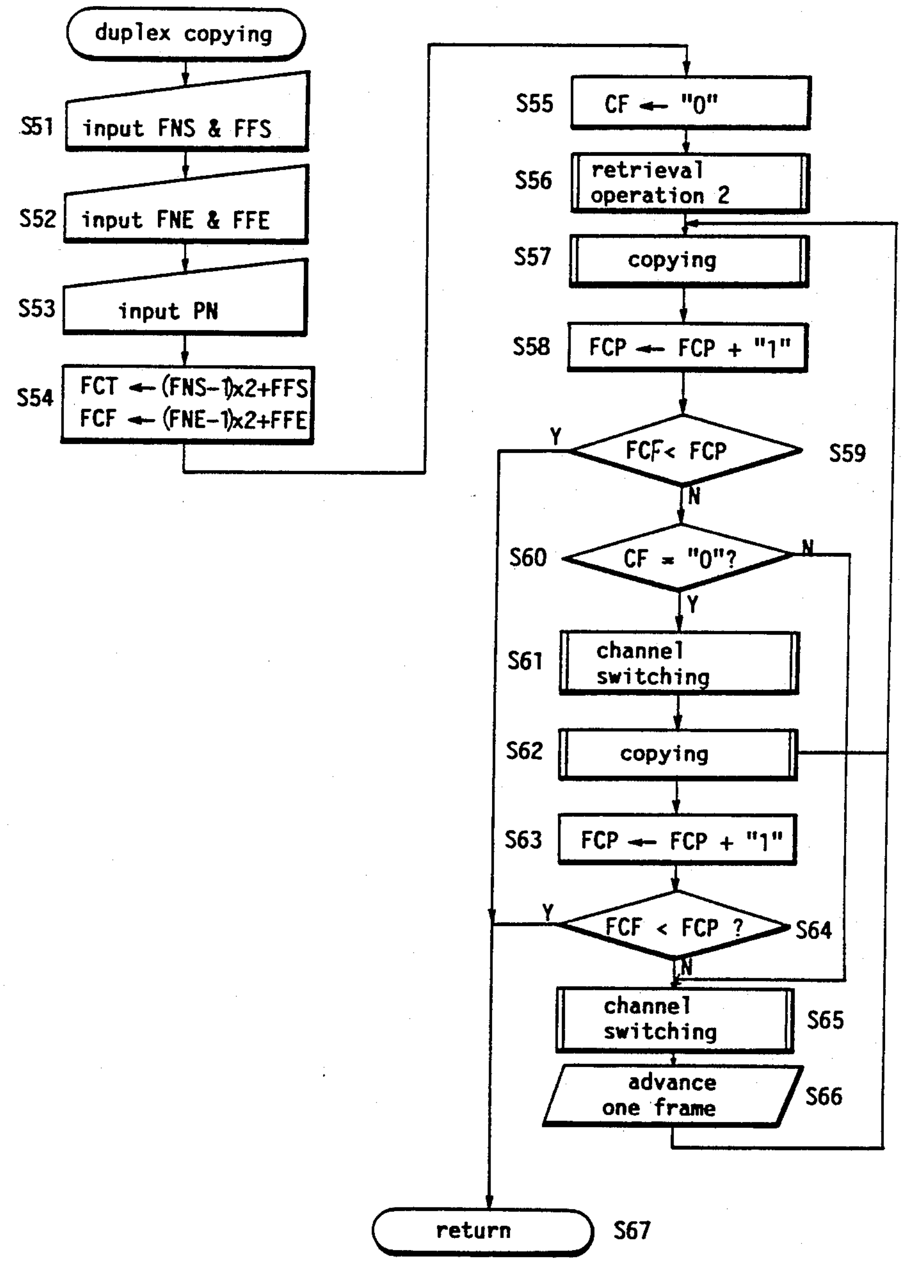
FIG. 15 is a flowchart of a duplex copying operation.

FIG. 15 shows a flowchart for copying an image photographed into a duplex film onto the photoreceptor drum as one example of copying operation at step S28. This illustrates a specific example of control action of the film transport control unit 63 acting as the second frame advance means.

This subroutine for duplex copying is called by operating the film select key 5*a* and print key 5*d* of the control unit 5. First, the number of copy starting frame FNS and the code of copy starting channel FFS are input at step S51. Then the number of copy finishing frame FNE and the code of copy finishing channel FFE are input at step S52. As data for the channel codes FFS and FFE, A-channel is set to "1" and B-channel to "2". Subsequently, at step S53 the number of copies to be taken of each frame is manually key-input, which is followed by step S54 at which a count FCT for starting the copying operation is derived from the copy starting frame number FNS and the channel code FFS, and similarly a count for finishing the copying operation is derived from the copy finishing frame number FNE and the copy finishing channel code FFE.

Subsequently, at step S55 the channel flag CF for indicating a channel currently processed is set to "0", namely to A-channel, and at step S56 a subroutine for retrieval operation 2 is called. Next, at step S57 the copying is carried out to copy the image in the copy starting frame number FNS onto the photoreceptor drum. At step S58 the frame count FCP is incremented by one, and at step S59 checking is made whether the frame count FCP is smaller than the copy finishing count FCF or not. If count FCP is greater than the finishing count FCF, the program returns to the main routine shown in FIG. 10*b*. If count FCP is smaller than the finishing count FCF, the present channel is identified by means of channel flag CF at step S60. If A-channel is the present channel, the program proceeds to step S61 for executing a channel switching subroutine to switch from A-channel to B-channel. Then, at step S62 the image in a next frame is copied and at step S63 frame count FCP is further incremented by one. At step S64 checking is made again whether the frame count FCP is smaller than the copy finishing count FCF or not. If count FCP is smaller than the finishing count FCF, the channel switching subroutine is repeated at step S65 to switch from B-channel to A-channel. At step S66 the film transport mechanism 7 is actuated to advance the roll film F one frame. Then the program returns to step S57 to repeat the copying operation to copy the image contained in A-channel. On the other hand, if frame count FCP is found to be greater than the copy finishing count FCF at step S64, the program returns to the main routine shown in FIG. 10*b*. If at step S60 the present channel is judged to be B-channel, the program jumps to step S65 for executing the channel switching subroutine to switch from B-channel to A-channel, which is followed by the described step S66 for advancing the film F one frame and the return to step S57.

Figure 16:
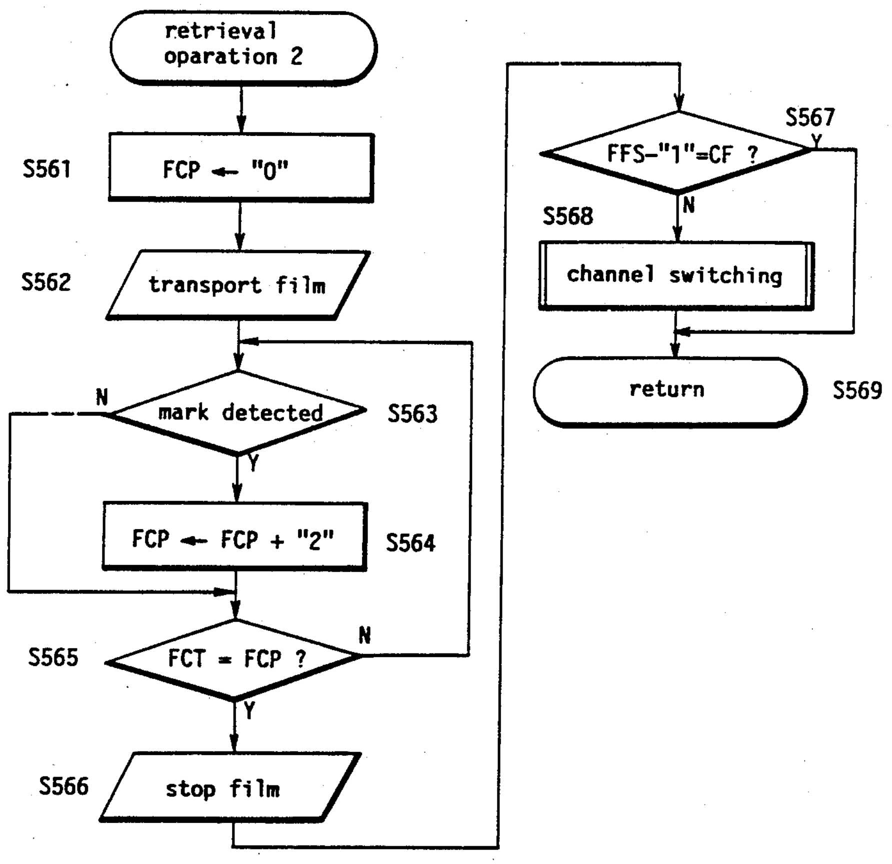
FIG. 16 is a flowchart of retrieval operation 2.

FIG. 16 is a flowchart showing the specific control sequence for the retrieval operation. At step S561 the frame count FCP is reset, and then at step S562 the film transport mechanism 7 is driven to start transporting the roll film F. At step S563 the signal from the blip mark detector 61 is checked to find out whether blip mark M is detected or not. If blip mark M is not detected, the program moves to step S565. If step S563 shows detection of blip mark M, the frame count FCP is incremented by a predetermined value, for example by two, at step S564, and the program moves to step S565. Step S565 judges whether the frame count FCP equals the copy starting count FCT or not. If the frame count FCP does not equal the copy starting count FCT, the program returns to step S563. If the two counts are equal, the film transport mechanism is stopped at step S566 to stop the film F. Then at step S567 checking is made whether the set channel is A-channel by means of the channel code FFS of the copy starting frame and the channel flag CF. If the set channel is B-channel, the channel switching subroutine is executed at step S568 for switching from A-channel to B-channel by moving the movable deck 23 of the carrier 3 transversely of the film F. Thereafter, at step S569 the program returns to the subroutine for duplex copying (FIG. 15). In this state the center of frames FFB in B-channel coincides with the projecting optical axis L.

On the other hand, if at step S567 the set channel is found to be A-channel, the program just returns to the duplex copying subroutine. In this state the center of frames FFA in A-channel coincides with the projecting optical axis L.

Figure 17:
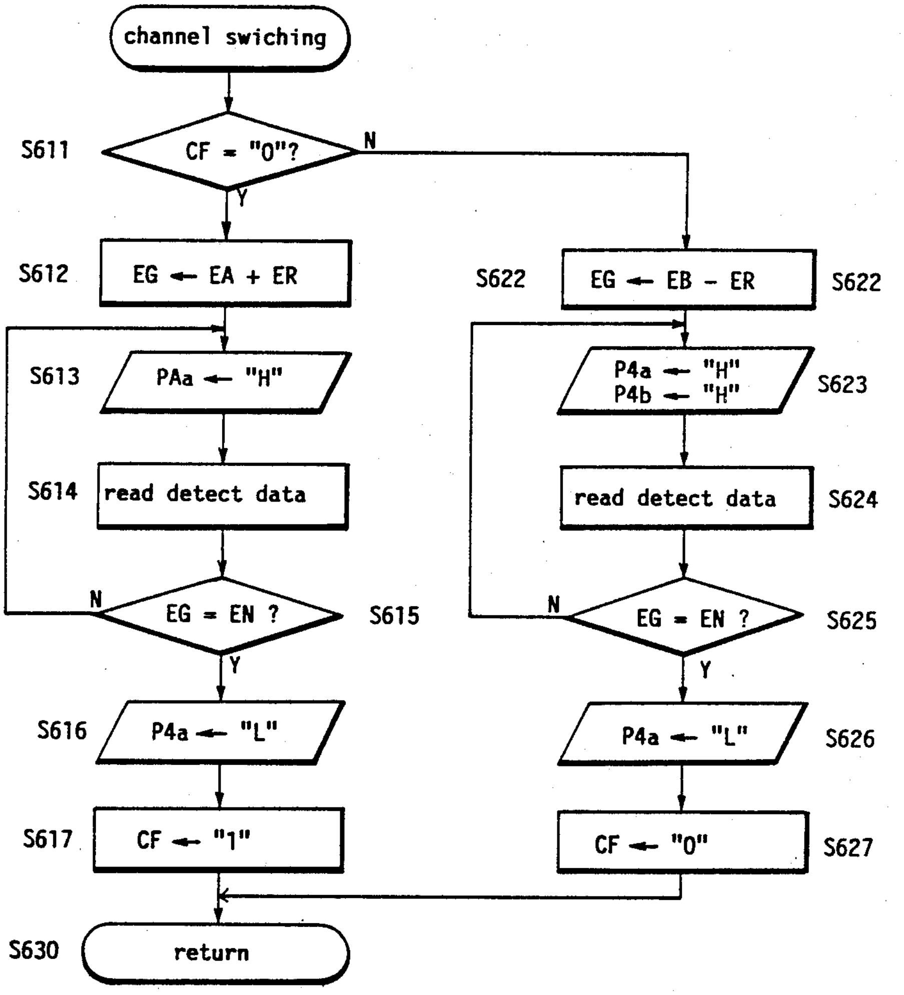
FIG. 17 is a flowchart of a channel switching operation.

FIG. 17 is a flowchart showing the control sequence for the channel switching operation. At step S611 checking is made by means of channel flag CF whether the present channel is A-channel or B-channel. The program moves to step S612 if the present channel is A-channel, and to step S622 if the present channel is B-channel. Each of these steps derives a target value EG for the detection data by the rotary encoder 31 corresponding to the channel which is not the present channel.

When switching from A-channel to B-channel, the target value EG is derived at step S612 by adding cross slide data ER corresponding to a distance (which is referenced dR in FIG. 1B) between centerlines extending longitudinally of the roll film F through the respective channels, to present data EA corresponding to the position of A-channel. When switching from B-channel to A-channel, the target value EG is derived at step S622 by subtracting the cross slide data ER from present data EB corresponding to the position of B-channel. That is to say, the positions of A-channel and B-channel are arranged to correspond to coordinate positions transversely of the film F, and the relative position between the screen 1 and the film F are expressed as data on this coordinate system.

For switching from A-channel to B-channel, only the output port P4*a* is switched to high level at step S613 to drive the third motor 27 of the projected frame selecting means 59 and the detection data from the rotary encoder 31 is read at step S614. Step S615 judges whether this data has reached the target value EG. If it has not reached the target value EG, the program returns to step S613 to continue driving the third motor 27 in forward rotation. If the detection data has reached target value EG, the output port P4*a* is switched to low level at step S616 to stop the third motor 27. Then, at step S617 the channel flag CF is set to "1" for B-channel and at step S630 the program makes a return.

For switching from B-channel to A-channel, the output ports P4*a* and P4*b* are switched to high level at step S623 to rotate the third motor 27 in opposite directions, and the detection data is read from the encoder 31 at 624. Step S625 judges whether this data has reached the target value EG. If it has not reached the target value EG, the program returns to step S623 to continue driving the third motor 27. If the detection data has reached target value EG, the output port P4*a* is switched to low level at step S626 to stop the third motor 27. Then, at step S627 the channel flag CF is set to "0" for A-channel and at step S630 the program makes a return.

When this channel switching subroutine is called at step S61 of the duplex copying operation and at step S568 of retrieval operation 2, the switching is made from A-channel to B-channel and the program proceeds from step S611 through steps S612, S613 and S614.

When the channel switching subroutine is called at step S65 of the duplex copying operation, the switching is made from B-channel to A-channel and the program proceeds from step S611 through steps S622, S623 and S624.

Figure 18:
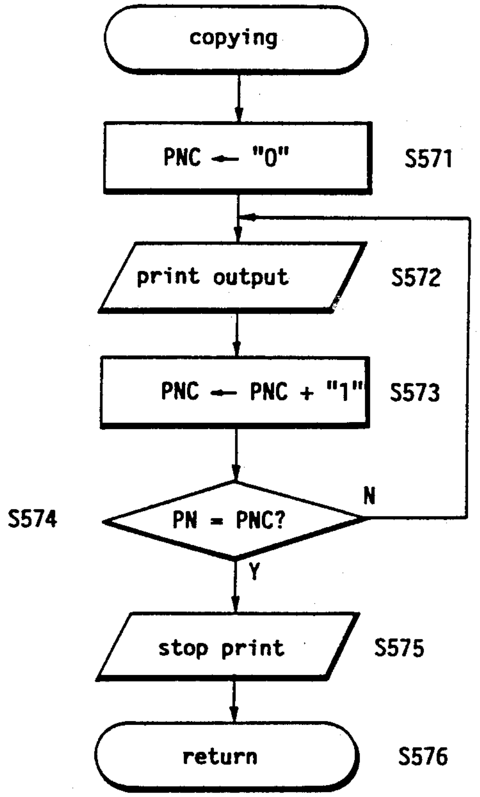
FIG. 18 is a flowchart of a copying.

FIG. 18 is a flowchart showing a specific copying sequence executed at steps S57 and S62 of the duplex copying operation. First, step S571 resets print counter PNC which is incremented by one when each copy is taken. Then, at step S572 a print output is provided for starting a recording operation.

This causes the projecting optical system to scan the image for forming an electrostatic image on the photorecepter drum, rotates the drum, and permits recording paper P to be fed from a paper feeder. Next, at step S573 print counter PNC is incremented by one, and at step S574 the count of print counter PNC is compared with the intended copy number data PN input at step S53 of the duplex copying operation.

If the count of print counter PNC has not reached the copy number data PN, the program returns to step S572 to provide the print output again. If the count of print counter PNC reaches the copy number data PN, the print output is stopped at step S575 and the program returns to the duplex copying subroutine at step S576.

By executing the duplex copying subroutine as described above, correlated sequential images may be copied even from the duplex and printed in magnification onto recording paper P sequentially without putting the correlation into disorder. Where the images are sequentially arranged in one direction as in the simplex film and duofilm, desired film images may readily be copied in magnification by actuating the film transport control unit 63 acting as the first film advance means.

Figure 19A:
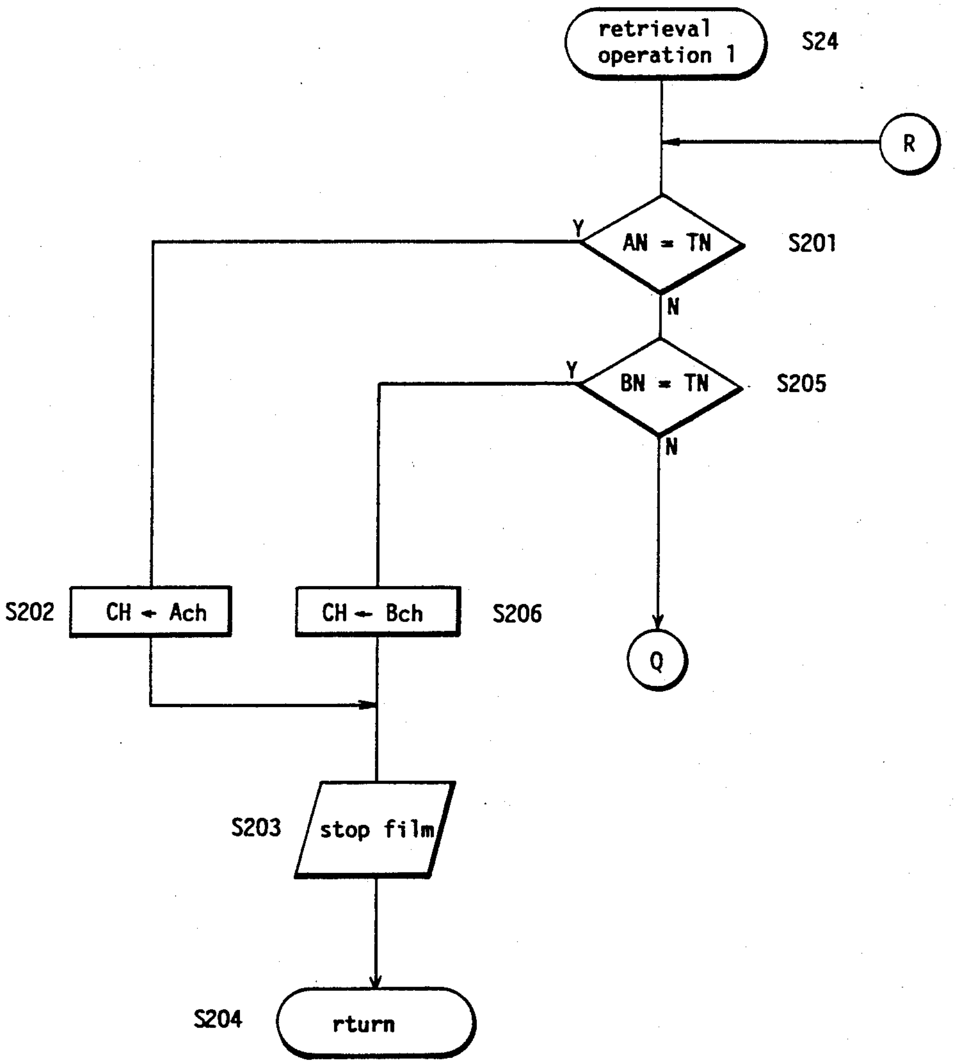
FIGS. 19*a* and 19*b* are a flowchart of retrieval operation 1.
Figure 19B:
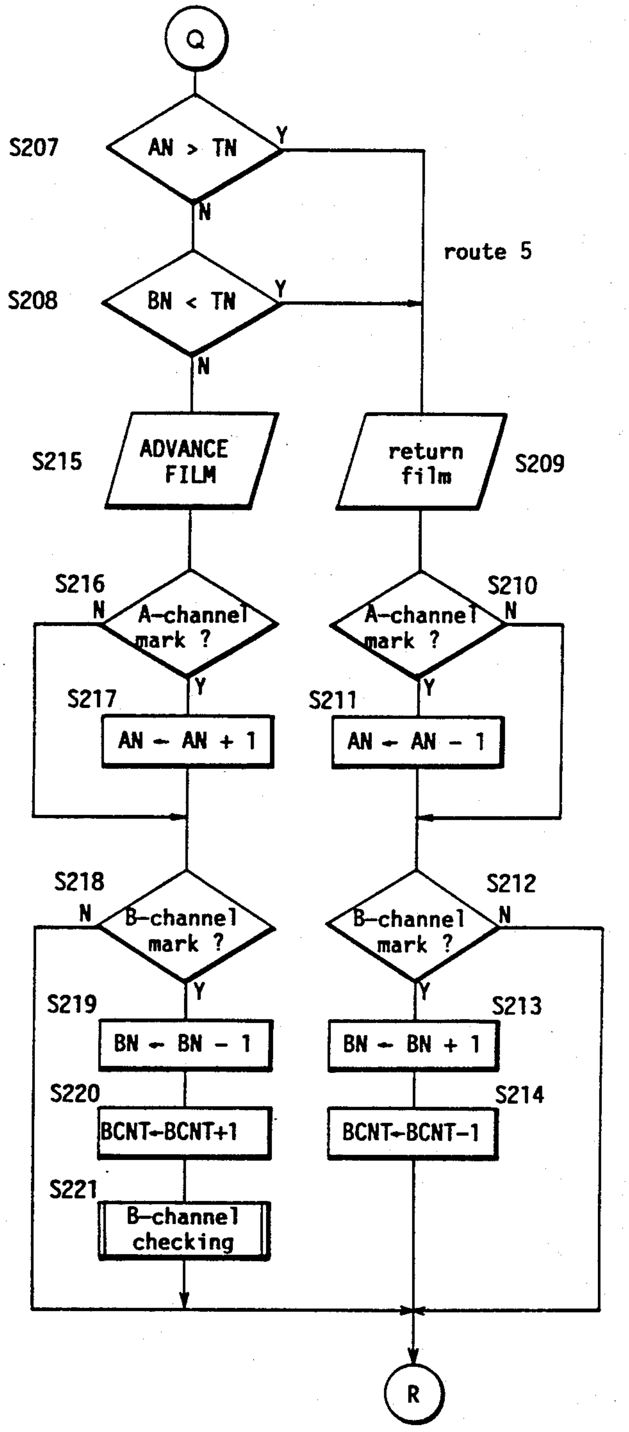

FIGS. 19*a* and 19*b* are a flowchart showing the control sequence for the retrieval operation 1 executed at step S24 of route 3 in FIG. 10*b*. This operation is effected to find an A-channel frame number or a B-channel frame number identifying with a retrieval target frame number. When the subroutine for retrieval operation 1 is called at step S24, checking is made at step S201 whether the number of a frame in A-channel identifies with the target frame number or not. If the number of a frame in A-channel identifies with the target frame number, the retrieval of A-channel is determined to have been completed at step S202. Then, the first and second motors 10, 15 (FIG. 4) are stopped at step S203 to stop the roll film, and the program makes a return at step S204. If the frame numbers of A-channel are different from the target frame number, checking is made at step S205 whether the number of a frame in B-channel identifies with the target frame number. If the number of a frame in B-channel identifies with the target frame number, the retrieval of B-channel is determined to have been completed at step S206. Then the program proceeds to steps S203 and S204 as above.

If the frame numbers in both A-channel and B-channel are different from the retrieval target frame number, checking is made first at step S207 whether the frame numbers in A-channel are greater than the target frame number (AN>TN) or not. If the frame numbers in A-channel are greater than the target frame number, the program takes route 5 and searches the frame number identifying with the target frame number by transporting the roll film backward. On the other hand, if the frame numbers in A-channel are smaller than the target frame number, the retrieval is made for B-channel. That is, checking is made at step S208 whether or not the frame numbers in B-channel are smaller than the target frame number (BN<TN). Only the duofilm has blip marks M for B-channel. Moreover, as described hereinbefore, the duofilm has images photographed into A-channel and B-channel sequentially and in reversed relations. Therefore, when the frame numbers in B-channel are smaller than the target frame number, the program takes route 5 as when the frame numbers in A-channel are grater than the target frame number, and the frame number identifying with the target frame number is searched through A-channel by transporting the roll film backward. To be particular, route 5 includes step S209 for providing an output to transport the roll film backward, and step S210 for checking if there are blip marks M along A-channel. If there are blip marks M along A-channel, the frame number is set to AN-1 and the roll film is transported backward by one frame at step S211. If no blip marks are found along A-channel at step S210, checking is made at step S212 whether there are blip marks M along B-channel or not. If there are no blip marks along B-channel, the program returns to step S201. If blip marks M are found along B-channel, the frame number is set to (BN+1) at step S213. Then the number of B-channel blip marks is set to (BCNT−1), and the roll film is transported backward by one frame at step S214. Thereafter the program returns to step S201. The output for transporting the roll film backward at step S209 is provided by driving the second motor 15 (see FIG. 4).

If the frame numbers in A-channel are smaller than the target frame number (AN<TN) and the frame numbers in B-channel are greater than the target frame number (BN>TN), the retrieval is carried out by transporting the roll film forward. That is, the program proceeds from step S216 through steps S217, S218 and S219 to step S220 and so on in the illustrated flowchart. Then, a B-channel checking subroutine is executed at step S221 for reconfirming that this roll film is a duofilm. Thereafter the program returns to step S201. The output for transporting the roll film F at step S215 is provided by driving the first motor 10.

The described operation is repeated until the number of a frame in A-channel or B-channel identifies with the target frame number. That is, the retrieval operation is repeated until the program moves from step S201 to step S204 through steps S202 and S203 or through steps S205 and S206.

Figure 20:
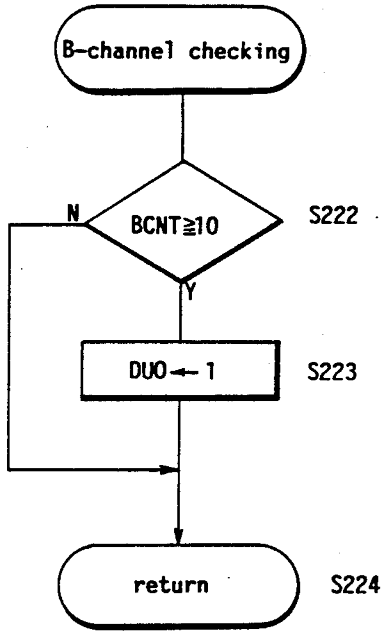
FIG. 20 is a flowchart of a B-channel checking operation.

FIG. 20 is a flowchart showing the B-channel checking subroutine, which is for checking whether the roll film in use is a duofilm or not. When the B-channel checking subroutine is called, checking is made first at step S222 whether or not the number of blip marks along B-channel equals or exceeds a predetermined number such as 10 for example (BCNT≧10). If the number of blip marks is less than 10, the film is judged to be a different kind than the duofilm, and the program makes a return at step S224. If the number of blip marks equals or exceeds 10, the film is judged to be a duofilm, and the DUO flag is set to "1" at step S223. The program then makes the return at step S224.

Figure 21:
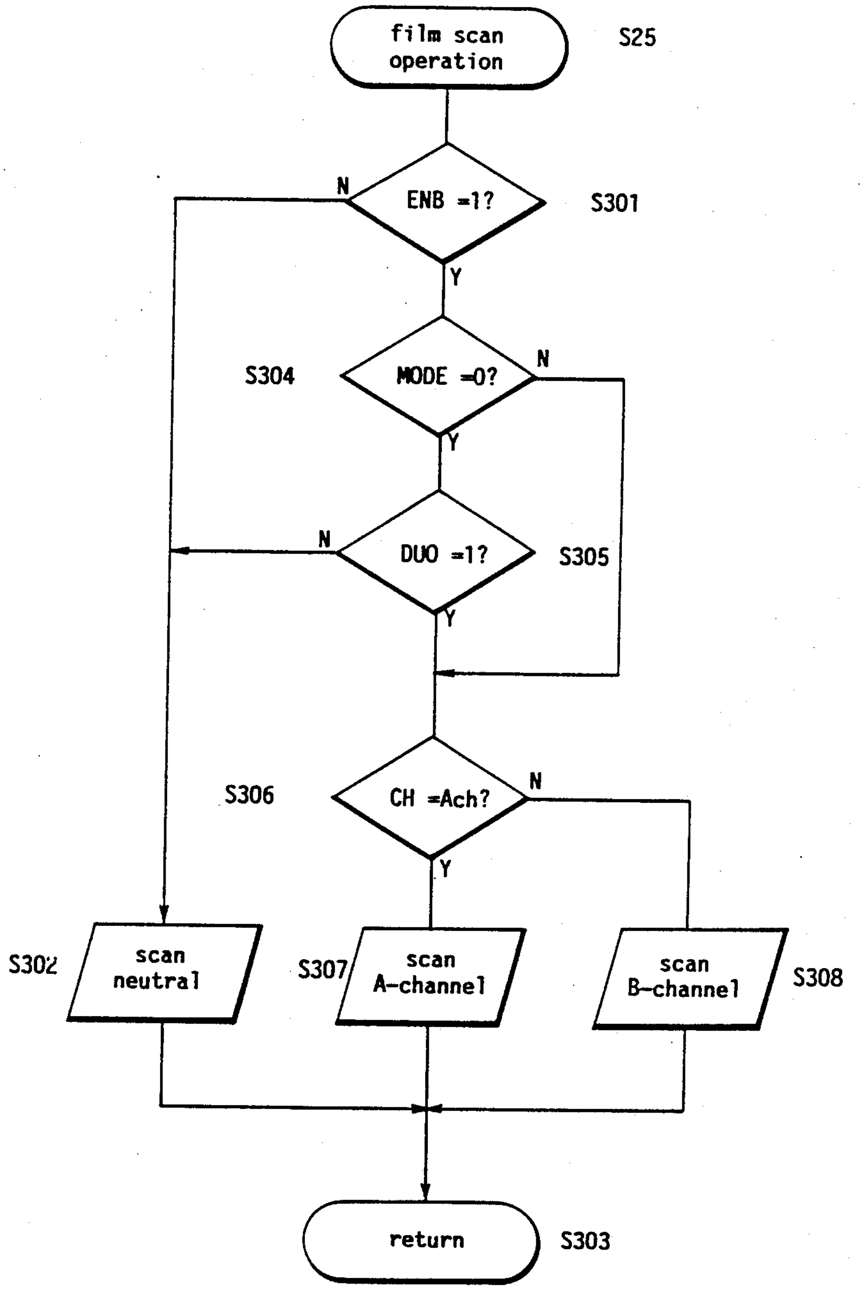
FIG. 21 is a flowchart of a film scan operation.

FIG. 21 is a flowchart of the film scan operation carried out at step S25 in FIG. 10*b*. When this subroutine is called, checking is made at step S301 whether the scanning is permitted or not. If it is not permitted, a scan neutral indication is given on the screen at step S302, and the program makes a return at step S303. At this time the roll film F is projected onto the screen such that the center of the roll film F coincides with the center of the screen. If the scanning is permitted, checking is made at step S304 whether the retrieval mode is a simplex film or duofilm retrieval mode or not. If it is, checking is made at step S305 whether the roll film is a duofilm or not. If the roll film is not a duofilm, then it is a simplex film which has one image per frame. Therefore, the scan neutral indication is output at step S302 and the program makes a return at step S303. If the retrieval mode is a duplex retrieval mode or the duofilm retrieval mode, checking is made at step S306 whether the channel having been retrieved is A-channel or not. If A-channel has been retrieved, an A-channel scan output is given at step S307 and a return is made at step S303. At this time the images in A-channel are projected onto the screen such that the centers of the images in A-channel coincide with the center of the screen. On the other hand, if the channel having been retrieved is not A-channel, namely if B-channel has been retrieved, a B-channel scan output is given at step S308, and a return is made at step S303. At this time the images in B-channel are projected onto the screen such that the centers of the images in B-channel coincide with the center of the screen.

Figure 22A:
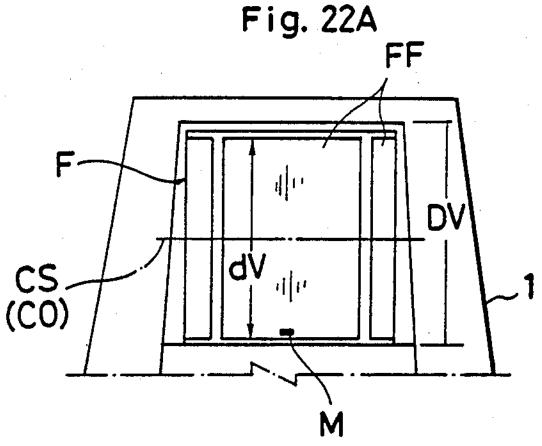
FIGS. 22A through 22C are views of images projected on to a screen.
Figure 22B:
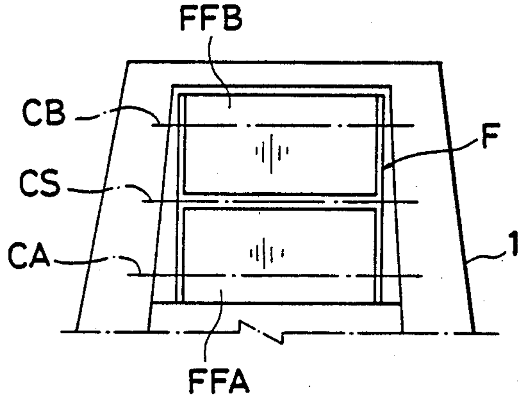
Figure 22C:
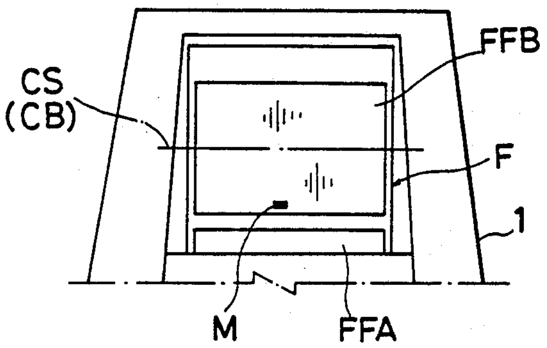

FIGS. 22A through 22C show examples of roll film image projected onto the screen 1 of the described reader-printer. Referring to FIG. 22A illustrating the case of scan neutral output, the magnification rate normally is set such that the transverse size dv of frames FF of the simplex film substantially corresponds to the vertical size Dv of the screen 1. The movable deck 23 of the roll film carrier 3 is positioned for the frames FF of the simplex film to be projected with the center line Co extending longitudinally of the film coinciding with a center line Cs of the screen 1.

When the duofilm or duplex film is used in this state, two film images photographed into a pair of frames FFA and FFB arranged transversely of the roll film F are simultaneously projected onto the screen 1 as shown in FIG. 22B.

This reader-printer, however, permits A-channel or B-channel along with blip marks M to be projected in magnification onto the screen 1 by varying the magnification rate of the projecting lens. To be particular, when the duofilm or the duplex film is used, the entire movable deck 23 of the carrier 3 is moved transversely of the roll film F to change the relative position between the roll film F and the screen 1, and the condenser lens is moved to a position to magnify the illuminated area of the roll film F. As a result, the entire frame FFA or FFB in either channel is projected with blip mark M onto the screen 1 as shown in FIG. 22C.

With the film image projecting apparatus according to the present invention as exemplified by this reader-printer, the condenser lens is positionally controlled to maintain blip marks M within an illuminated area despite movements of the roll film F transversely thereof, and an amount of illuminating light is cast substantially uniformly over the range of movement of blip marks M on the roll film F. Therefore, the blip mark sensor is free from detection errors, and a desired information retrieval may be carried out easily and speedily even if a fixed reference value is provided for the blip mark sensor. Where a duofilm or a duplex film is used, the sensor main body 35 reliably detects blip marks M to assure the same easy and speedy information retrieval. When printing the images, the condenser lens is set to an optimal position for copying the images, thereby to assure high quality image prints, which fulfills the objects of the present invention.

The present invention of course is not limited to the foregoing embodiment but may be modified without departing from its gist. For continuously copying images in a plurality of frames in a duplex film according to the described embodiment, channel switching is effected for copying the image in frame FFB of B-channel after the image in frame FFA of A-channel is copied, then a further channel switching is effected, and thereafter the roll film F is transported by one frame. However, the roll film F may be transported by one frame simultaneously with the switching from B-channel to A-channel.

For copying the transverse pair of frames, the image in frame FFA of A-channel is copied first, the image in frame FFB of B-channel is copied next, and then the channels are switched again. Instead of this sequence, after the first pair of frames is processed the next pair may be processed by copying the image in B-channel frame FFB first.

Further, in the described embodiment, the rotary encoder 31 is attached to the third motor 27 to provide data for judging which channel is in position for illumination at present. The rotary encoder 31 may be replaced with the combination of a potentiometer and an A/D converter. Another option is a microswitch closable through contact with the movable deck 23 of the carrier 3 when the deck 23 is in a position to place either channel for illumination. Then the state of this microswitch provides a basis for judging which channel is in position for illumination.

Various modifications are conceivable also for the channel switching construction operable where the duofilm and duplex film are used. For example, inclinations of the mirrors 38$a$–38$e$ of the projecting optical system 6 may be variable with respect to the projecting optical axis L, with the carrier 3 immovable transversely of the roll film. This construction permits variations of the image projection area on the screen 1 or photoreceptor drum 41 as desired.

The invention is adapted for handling a roll film containing a mixture of original images photographed sideways and those photographed upright. In this case a sensor may be provided for detecting the directions of original images, and in response to detection results the images are turned by the image turning prism 40 in the image projecting module 37 simultaneously with the channel switching and frame-by-frame transport of the roll film.

Roll films of different types may include target marks such as bar codes in their reader portions for identification of the types, and the reader-printer main body 2 may include a sensor acting as identifying means for reading the target marks and identifying the film types. This enables a suitable frame transport mode to be selected automatically in accordance with the type of film.

Further, it is considered that there is a certain optical illumination area depending on the type of roll film, namely the simplex film or the duplex film (and the duofilm). Therefore, an exposure lamp voltage for the duplex film and the duofilm and an exposure lamp voltage for the simplex film may be preset so that the voltage may be selected by the exposure lamp control unit 66 in accordance with the type of roll film to provide the optimal illumination area therefor.

It is also desirable to provide a plurality of condenser lenses to effect a continuous control by moving some of those lenses along the projecting optical axis. In the described embodiment the voltage of the exposure lamp 22 is adjusted to compensate for a reduction in the light intensity, but this compensation may be effected by lowering the reference value of the main body of the blip mark sensor. Furthermore, the roll film is automatically moved in the transverse directions thereof according to the described embodiment but the transverse movement may be effected manually instead. The projecting lens for setting the magnification rate may advantageously comprise a zoom lens for automatic magnification setting.

Furthermore, in the described embodiment, the condenser lens position is set in the reader mode without regard to the magnification of the projecting lens. However, the condenser lens position may be set depending on the projecting lens magnification only if conditions are provided for forming the illuminated area enabling detection of blip marks.

The present invention of course is applicable, besides the reader-printer as in the foregoing embodiment, to a microfilm reader having no image printing function and to a microfilm printer without the screen 1.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A film image projecting apparatus for handling a roll film, said apparatus comprising:

detecting means for automatically detecting whether said roll film contains a plurality of rows of frames;

a projecting optical system for projecting images contained in said roll film;

a first frame advance means for transporting said roll film frame by frame longitudinally thereof;

a second frame advance means operable when said roll film contains a plurality of rows of frames, for moving said roll film transversely thereof to place each of said rows of frames in an exposure section of said projecting optical system; and control means for causing said first frame advance means alone to transport said roll film when said roll film contains a single row of frames, and causing said first frame advance means and said second frame advance means to transport said roll film when said roll film contains a plurality of rows of frames.

2. An apparatus as claimed in claim 1, wherein said control means, when said roll film is a duplex film having two rows of frames arranged longitudinally of said roll film, is operable to place said two rows of frames alternately in said exposure section.

3. An apparatus as claimed in claim 2, further comprising copying means for copying frames in said exposure section.

4. An apparatus as claimed in claim 2, wherein said second frame advance means includes means movable in unison therewith transversely of said roll film.

5. An apparatus as claimed in claim 4, wherein said second frame advance means further includes detecting means for detecting a position of said roll film transversely thereof, and means for controlling a drive source for moving said roll film transversely thereof.

6. A film image projecting apparatus for handling a duplex roll film containing two rows of frames, said apparatus comprising:

a projecting optical system for projecting images contained in said roll film;

a first frame advance means for transporting said roll film frame by frame longitudinally thereof;

a second frame advance means for moving said roll film by one row transversely thereof; and control means for actuating said second frame advance means each time said first frame advance means transports said roll film by one frame.

7. An apparatus as claimed in claim 6, wherein said second frame advance means includes means movable in unison therewith transversely of said roll film.

8. An apparatus as claimed in claim 7, wherein said second frame advance means further includes detecting means for detecting a position of said roll film transversely thereof, and means for controlling a drive source for moving said roll film transversely thereof.

9. A film image projecting apparatus for handling a duplex-type roll film containing two rows of frames, said apparatus comprising:

a screen for displaying images;

copying means for copying projected images on recording medium;

film transport means for longitudinally transporting said roll film containing two rows of frames;

a projecting optical system for projecting images contained in said roll film selectively onto said screen and a photoreceptor of said copying medium;

film moving means for transversely moving said roll film so as to selectively coincide the center line of either of said two rows with an optical axis of said projecting optical system; and control means for Controlling said copying means, film transport means and film moving means so that the frame images in one row and in another row are alternately copied.

10. An apparatus as claimed in claim 9, wherein said film transport means includes a supply reel, a takeup reel and a drive mechanism.

11. A film image projecting apparatus for retrieving information by searching blip marks arranged laterally of frames in a roll film, said apparatus comprising:

film transport means for longitudinally transporting said roll film including said blip marks arranged laterally of said frames;

film moving means for transversely moving said roll film;

judging means for judging whether said roll film contains a plurality of rows of frames;

a projecting optical system for projecting images contained in said roll film; and control means operable when said roll film is judged by said judging means to contain a plurality of rows of frames, for enlarging an illuminated area on said roll film.

12. An apparatus as claimed in claim 11, wherein said film transport means includes a supply reel, a takeup reel and a drive mechanism.

13. An apparatus as claimed in claim 11, wherein said film moving means includes a base, a movable deck and a drive mechanism.

14. An apparatus as claimed in claim 11, wherein said judging means includes automatic setting means.

15. An apparatus as claimed in claim 11, wherein said judging means includes manual setting means.

16. An apparatus as claimed in claim 11, wherein said projecting optical system includes a condenser lens, a condenser lens drive mechanism, and a projecting module.

17. An apparatus as claimed in claim 16, wherein said projecting module includes a projecting lens, a projecting lens judging sensor, and an image turning prism.

18. An apparatus as claimed in claim 16, wherein said control means is operable to control said condenser lens drive mechanism.

19. A film image projecting apparatus for retrieving information by searching blip marks arranged laterally of frames in a roll film, said apparatus comprising:

film transport means for longitudinally transporting said roll film including said blip marks arranged laterally of said frames;

film moving means for transversely moving said roll film;

a projecting optical system for projecting images contained in said roll film; and control means operable for enlarging an illuminated area on said roll film so that an amount of illuminating light is substantially uniform over a range within which said blip marks are movable with movement of said roll film transversely thereof.

20. An apparatus as claimed in claim 19, wherein said projecting optical system includes a condenser lens, a condenser lens drive mechanism and a projecting module.

21. An apparatus as claimed in claim 20, wherein said control means is operable to control said condenser lens drive mechanism.

22. A reader-printer for retrieving information by searching blip marks arranged laterally of frames in a roll film, said reader-printer comprising:

film transport means for longitudinally transporting said roll film including said blip marks arranged laterally of said frames;

a screen for displaying images;

copying means for copying projected images on recording medium;

a projecting optical system for projecting images contained in said roll film selectively onto said screen and a photoreceptor of said copying means;

blip mark detecting means for detecting said blip marks and setting a desired one of said frames to a position in an exposure section of said projecting optical system;

illuminating means for forming an adjustable illuminated area on said roll film disposed in said exposure section;

mode selecting means for switching between a read mode and a print mode; and control means for controlling said illumination means to illuminate said frames and said blip marks in said read mode, and to illuminate a desired area of frame in said print mode.

23. A reader-printer as claimed in claim 22, wherein said projecting optical system includes a projecting lens and means for varying magnification of said projecting lens.

24. A reader-printer as claimed in claim 23, wherein said illuminating means includes means for varying said illuminated area in accordance with the magnification of said projecting lens.

25. A reader-printer as claimed in claim 24, wherein said control means is operable in said read mode, for controlling said illuminating means to illuminate a fixed area regardless of the magnification of said projecting lens.

26. A reader-printer as claimed in claim 24, wherein said illuminating means includes means for varying an amount of illuminating light in accordance with the magnification of said projecting lens.

27. A reader-printer for retrieving information by searching blip marks arranged laterally of frames in a roll film, said reader-printer comprising:

film transport means for longitudinally transporting said roll film including said blip marks arranged laterally of said frame;

a screen for displaying images;

copying means for copying projected images on recording medium;

a projecting optical system including a projecting lens for projecting images contained in said roll film selectively onto said screen and a photoreceptor of said copying means;

blip mark detecting means for detecting said blip marks and setting a desired one of said frames to a position in an exposure section of said projecting optical system;

illuminating means for forming an adjustable illuminated area on said roll film disposed in said exposure section by emitting an adjustable amount of illuminating light;

mode selecting means for switching between a read mode and a print mode;

identifying means for identifying magnification of said projecting lens; and control means for controlling said illuminating means to illuminate a predetermined area in said read mode, and to illuminate an area which is varied in accordance with the magnification of said projecting lens in said print mode.

28. A reader-printer as claimed in claim 27, wherein said illuminating means includes means for varying an exposure lamp voltage.

29. A reader-printer as claimed in claim 27, wherein said projecting lens comprises a zoom lens.

30. A reader-printer as claimed in claim 27, wherein said illuminating means includes a condenser lens and a condenser lens drive mechanism, said control means controls the condenser lens drive mechanism.

31. A film image projecting apparatus for retrieving information by searching blip marks arranged laterally of frames in a duplex-type roll film containing two rows of frames, said apparatus comprising:

film transport means for longitudinally transporting said roll film;

film moving means for transversely moving said roll film;

a projecting optical system for projecting images contained in said roll film;

means for giving a retrieval instruction;

blip mark detecting means for detecting said blip marks; and control means responsive to the retrieval instruction for controlling said film moving means so as to locate said roll film at a predetermined position where said blip marks in said roll film are illuminated by an illuminating system of said projecting optical system.

32. An apparatus as claimed in claim 31, wherein said film transport means includes a supply reel, a takeup reel and a drive mechanism.

33. An apparatus as claimed in claim 31, wherein said film moving means includes a base, a movable deck and a drive mechanism.

* * * * *